US008447529B2

(12) United States Patent
Hernandez et al.

(10) Patent No.: US 8,447,529 B2
(45) Date of Patent: May 21, 2013

(54) METHOD AND SYSTEM FOR PREDICTING CORROSION RATES USING MECHANISTIC MODELS

(75) Inventors: Sandra E. Hernandez, Anchorage, AK (US); Ziru Zhang, Anchorage, AK (US); Richard C. Woollam, Katy, TX (US); Jose R. Vera, Katy, TX (US); William H. Durnie, Harrisdale (AU)

(73) Assignee: BP Corporation North America Inc., Houston, TX (US)

( * ) Notice: Subject to any disclaimer, the term of this patent is extended or adjusted under 35 U.S.C. 154(b) by 462 days.

(21) Appl. No.: 12/689,105

(22) Filed: Jan. 18, 2010

(65) Prior Publication Data

US 2010/0185401 A1 Jul. 22, 2010

Related U.S. Application Data

(60) Provisional application No. 61/145,645, filed on Jan. 19, 2009.

(51) Int. Cl.
*G01N 31/00* (2006.01)

(52) U.S. Cl.
USPC ............ 702/25; 702/34; 205/776.5; 205/777; 204/404

(58) Field of Classification Search
USPC ............... 702/25, 34, 50, 53; 436/6; 204/404; 205/776.5, 777
See application file for complete search history.

(56) References Cited

U.S. PATENT DOCUMENTS 4,752,360 A * 6/1988 Jasinski ..................... 205/776.5
2010/0023276 A1 1/2010 Gupta et al.

FOREIGN PATENT DOCUMENTS

| | | |
|---|---|---|
| CN | 1032910 A | 5/1989 |
| CN | 1903747 A | 1/2007 |
| WO | WO 2006003118 | 1/2006 |
| WO | WO 2007102079 | 9/2007 |

OTHER PUBLICATIONS

International Search Report and the Written Opinion of PCT/US2010/021322 filed Jan. 18, 2010; dated Jun. 15, 2010.
Beggs et al., "Estimating the Viscosity of Crude Oil Systems", J. Petroleum Tech. (SPE, 1975), pp. 1140-1144.
Lee et al., "The Viscosity of Natural Gases", J. Petroleum Tech., (SPE, 1966), pp. 997-1002.
Hedges et al., "The Role of Acetate in CO2 Corrosion: the Double Whammy", CORROSION/99, Paper No. 21, (Houston, TX: NACE International, 1999).

(Continued)

*Primary Examiner* — Manuel L Barbee
(74) *Attorney, Agent, or Firm* — Jayne C. Piana

(57) ABSTRACT

A computer system and method for predicting the aqueous phase $CO_2$ corrosion rate of a pipe useful in the production and transportation of oil and gas. Input parameter values corresponding to water chemistry and physical fluid and pipe properties are received. Based on these input parameter values, the system and method derive current-voltage relationships for multiple cathodic reduction reactions according to an electrochemical model of the corrosion reaction, and a current-voltage relationship for the anodic oxidation reaction of iron dissolution. A current density is obtained, at the intersection of an extrapolation of the anodic current-voltage relationship and an extrapolation of the summed cathodic current-voltage relationships. The predicted corrosion rate is then calculated from the obtained current density. The effects of secondary parameters such as scale and flow regime, and the efficacy of a corrosion inhibitor, can also be evaluated.

32 Claims, 10 Drawing Sheets

OTHER PUBLICATIONS

Beggs et al., "A Study of Two-Phase Flow in Inclined Pipes", J. Petroleum Tech. (SPE, 1973), pp. 607-617.

Nesic et al., An electrochemical model for prediction of corrosion of mild steel in aqueous carbon dioxide solutions. Corrosion, 52 (1996), pp. 280 et seq.

Nordsveen et al., "A Mechanistic Model for Carbon Dioxide Corrosion of Mild Steel in the Presence of Protective Iron Carbonate Films—Part 1: Theory and Verification", Corrosion, vol. 59, No. 5 (2003).

Glaso, "Generalized Pressure-Volume-Temperature Correlations", J. Petroleum Tech., (SPE, 1980), pp. 785-795.

Waard et al., "Prediction of Carbonic Acid Corrosion in Natural Gas Pipelines", First International Conference on the Internal and External Protection of Pipes, Paper F1 (Cranfield, UK: BHRA Fluid Engineering, 1975).

Gray et al., Mechanism of carbon steel corrosion in brines containing dissolved carbon dioxide at pH 4, CORROSION/1989 Paper No. 464, (Houston, TX: NACE International, 1989).

Baker et al., Finding Surface Tension of Hydrocarbon Liquids, Oil and Gas Journal (1956), pp. 96-104.

Hough et al., "Interfacial Tensions at Reservoir Pressures and Temperatures; Apparatus and the Water-Methane System", Trans. AIME (1951), pp. 57-60.

Partial English Translation of CN1032910A from http://59.151.93.237//sipo_EN/search/detail, Publication Date May 17, 1989, 1 page.

English abstract of CN1903747 A from http://worldwide.espacenet.com, Publication Date Jan. 31, 2007, 1 page.

* cited by examiner

FIG. 5

41

| | CASE NUMBER | CASE 1 | CASE 2 | CASE 3 | CASE 4 |
|---|---|---|---|---|---|
| | USER NOTES: | TESTING SAMPLE 1 | TESTING SAMPLE 2 | TESTING SAMPLE 3 | TESTING SAMPLE 4 |
| WATER CHEMISTRY | ION | CONCENTRATION mg/L (ppm) | CONCENTRATION mg/L (ppm) | CONCENTRATION mg/L (ppm) | CONCENTRATION mg/L (ppm) |
| | Cl | 0 | 0 | 0 | 0 |
| | SO4 | 0 | 0 | 0 | 0 |
| | Ba | 0 | 0 | 0 | 0 |
| | Ca | 0 | 0 | 0 | 0 |
| | Sr | 0 | 0 | 0 | 0 |
| | Mg | 0 | 0 | 0 | 0 |
| | Na | 0 | 0 | 0 | 0 |
| | K | 0 | 0 | 0 | 0 |
| | HCO3 | 0 | 55 | 600 | 8000 |
| | Fe | 0 | 0 | 0 | 0 |
| | Ac | 0 | 0 | 0 | 0 |
| INPUT DATA | | | | | |
| TEMPERATURE | °C | 40.0 | 40.0 | 40.0 | 40.0 |
| TOTAL PRESSURE | bar | 100.0 | 100.0 | 100.0 | 100.0 |
| $CO_2$ CONCENTRATION IN THE GAS | mol% | 1.00 | 1.00 | 1.00 | 1.00 |
| $H_2S$ CONCENTRATION IN THE GAS | mol% | 0.00 | 0.00 | 0.00 | 0.00 |
| DISSOLVED OXYGEN | ppb | 0.0 | 0.0 | 0.0 | 0.0 |
| GAS FLOW RATE | mmscf/d | 5.000 | 5.000 | 5.000 | 5.000 |
| OIL FLOW RATE | mbd | 10.000 | 10.000 | 10.000 | 10.000 |
| WATER FLOW RATE | mbd | 1.000 | 1.000 | 1.000 | 1.000 |
| INTERNAL DIAMETER | m | 0.1 | 0.1 | 0.1 | 0.1 |
| INCLINATION ANGLE | DEGREES | 0.0 | 0.0 | 0.0 | 0.0 |
| CONDENSED WATER? | YES/NO | no | no | no | no |
| SPECIFIC GAS GRAVITY | | 0.80 | 0.80 | 0.80 | 0.80 |
| SPECIFIC OIL GRAVITY | | 0.80 | 0.80 | 0.80 | 0.80 |
| SPECIFIC WATER GRAVITY | | 1.05 | 1.05 | 1.05 | 1.05 |

FIG. 9

61

| | CASE NUMBER | CASE 1 | CASE 2 | CASE 3 |
|---|---|---|---|---|
| | USER NOTES: | TESTING SAMPLE 1 | TESTING SAMPLE 2 | TESTING SAMPLE 3 |
| WATER CHEMISTRY | ION | CONCENTRATION mg/L (ppm) | CONCENTRATION mg/L (ppm) | CONCENTRATION mg/L (ppm) |
| | Cl | 0 | 0 | 0 |
| | SO4 | 0 | 0 | 0 |
| | Ba | 0 | 0 | 0 |
| | CA | 0 | 0 | 0 |
| | Sr | 0 | 0 | 0 |
| | Mg | 0 | 0 | 0 |
| | Na | 0 | 0 | 0 |
| | K | 0 | 0 | 0 |
| | HCO3 | 0 | 55 | 600 |
| | Fe | 0 | 0 | 0 |
| | Ac | 0 | 0 | 0 |
| INPUT DATA | | | | |
| TEMPERATURE | $^{0}C$ | 40.0 | 40.0 | 40.0 |
| TOTAL PRESSURE | Bar | 100.0 | 100.0 | 100.0 |
| $CO_2$ CONCENTRATION IN THE GAS | mol% | 1.00 | 1.00 | 1.00 |
| $H_2S$ CONCENTRATION IN THE GAS | mol% | 0.00 | 0.00 | 0.00 |
| DISSOLVED OXYGEN | ppb | 0.0 | 0.0 | 0.0 |
| GAS FLOW RATE | mmscf/d | 5.000 | 5.000 | 5.000 |
| OIL FLOW RATE | mbd | 10.000 | 10.000 | 10.000 |
| WATER FLOW RATE | mbd | 1.000 | 1.000 | 1.000 |
| INTERNAL DIAMETER | m | 0.1 | 0.1 | 0.1 |
| INCLINATION ANGLE | DEGREES | 0.0 | 0.0 | 0.0 |
| CONDENSED WATER? | YES/NO | no | no | no |
| SPECIFIC GAS GRAVITY | | 0.80 | 0.80 | 0.80 |
| SPECIFIC OIL GRAVITY | | 0.80 | 0.80 | 0.80 |
| SPECIFIC WATER GRAVITY | | 1.05 | 1.05 | 1.05 |
| WATER CHEMISTRY AND FLOW MODEL OUTPUT | | | | |
| IN-SITU CALC. pH | | 4.0 | 5.0 | 6.0 |
| SCALE TEMP | $^{0}C$ | 86.5 | 86.5 | 86.5 |
| pH STATS | | Status:OK | Status:OK | Status:OK |
| HYDRAULIC DIAMETER | m | 0.097 | 0.097 | 0.097 |
| LIQUID VELOCITY | m/s | 3.24 | 3.24 | 3.24 |
| FLOW PATTERN | | Slug | Slug | Slug |
| FLOW REGIME STATUS | | Status:OK | Status:OK | Status:OK |
| CORROSION MODEL OUTPUT ($H^+$, $CO_2$, HAC, $O_2$) | | | | |
| PREDICTED CORROSION RATE | mm $y^{-1}$ | **4.49** | **1.74** | **1.39** |
| SEVERITY LEVEL | | **4** | **4** | **4** |

FIG. 10

71

| Water Chemistry and Flow Model Output | | | | | |
|---|---|---|---|---|---|
| In-situ Calc. pH | | 4.0 | 5.0 | 6.0 | 7.0 |
| Scale Temp | °C | 86.5 | 86.5 | 86.5 | 86.5 |
| pH Stats | | Status:OK | Status:OK | Status:OK | Status:OK |
| Hydraulic Diameter | m | 0.097 | 0.097 | 0.097 | 0.097 |
| Liquid Velocity | m/s | 3.24 | 3.24 | 3.24 | 3.24 |
| Flow Pattern | | Slug | Slug | Slug | Slug |
| Flow Regime Status | | Status:OK | Status:OK | Status:OK | Status:OK |
| Corrosion Model Output ($H^+$, $CO_2$, HAc, $O_2$) | | | | | |
| Predicted Corrosion Rate | $mmy^{-1}$ | **4.49** | **1.74** | **1.39** | **1.34** |
| Severity Level | | **4** | **4** | **4** | **4** |
| Corrosion Inhibitor Guidelines Implementation | | | | | |
| **Inhibitor Guidelines Inputs** | | | | | |
| Corrosion Allowance | mm | 4 | 4 | 4 | 6 |
| Design Life | y | 25 | 25 | 25 | 25 |
| **Inhibited Corrosion Rates** | | | | | |
| Inhibited Corrosion Rate | mm $y^{-1}$ | 0.10 | 0.10 | 0.10 | 0.10 |
| Inhibited Corrosion Rate (design) | mm $y^{-1}$ | 0.16 | 0.16 | 0.16 | 0.24 |
| **Acceptability Criteria** | | | | | |
| System Effectiveness | | **Ask SME Hi** | **Accept** | **Accept** | **Ask SME Lo** |
| Overage | % | 0.65% | | | -9.49% |
| **Efficiency and Availability Prediction** | | | | | |
| Typical CI Efficiency Required | % | - | 93.3% | 91.5% | - |
| Typical CI Availability Required | % | - | 97.3% | 96.6% | - |

METHOD AND SYSTEM FOR PREDICTING CORROSION RATES USING MECHANISTIC MODELS

CROSS-REFERENCE TO RELATED APPLICATIONS

This application claims priority, under 35 U.S.C. §119(e), of Provisional Application No. 61/145,645, filed Jan. 19, 2009, incorporated herein by this reference.

STATEMENT REGARDING FEDERALLY SPONSORED RESEARCH OR DEVELOPMENT

Not applicable.

BACKGROUND OF THE INVENTION

This invention is in the field of evaluation and maintenance of pipes for carrying fluids. One aspect of this invention is more specifically directed to estimating rates of corrosion in pipelines and downhole tubing, for example as applied in the production and processing of oil, gas, and hydrocarbons.

Maintaining the integrity of piping systems is a fundamental function in maintaining the economic success, and minimizing the environmental risks, liabilities, and impact, of modern oil and gas production fields and systems. Of course, the integrity of large scale pipeline systems, such as the Trans-Alaska Pipeline System, is of substantial economic and environmental concern. In the downhole context, the integrity of metallic production casing of oil and gas wells is of concern, especially given the harsh and relatively inaccessible downhole environment. Pipe integrity is also of concern in other applications, including factory piping systems, municipal water and sewer systems, and the like. As is well known in the field of pipeline maintenance, corrosion and erosion of pipeline material by the presence and action of fluids flowing through the pipeline, will reduce the thickness of pipeline walls over time. In order to prevent pipe failure due to corrosion, it is of course important to monitor the extent to which pipe wall thickness has been reduced, so that timely repairs or replacement can be made.

The prevalent corrosion reagent in oil and gas pipelines and downhole casing is carbon dioxide ($CO_2$). Dry $CO_2$ gas is typically not corrosive at the temperatures in which typical oil and gas pipelines operate, but $CO_2$ that is dissolved into water is quite corrosive. In solution, dissolution of the aqueous phase $CO_2$ creates carbonic acid, which reacts with the steel inner surface of the pipeline, corroding the pipeline. Unfortunately, water is also typically present in oil and gas pipelines and in well casing, in one or more forms such as condensation from the gas phase, water produced from the reservoir along with the oil and gas, or water that has been injected into the reservoir to maintain reservoir pressure. The aqueous solution of $CO_2$ into this available water thus produces the carbonic acid that is one of the main corrosive agents in modern oil and gas pipelines.

Proper monitoring and maintenance of pipe integrity depends on some understanding of the rate at which the pipeline material corrodes. The ability to predict corrosion rates of pipe material can be used in various stages of the construction and operation of a piping system to ensure pipeline integrity, at optimal cost. The prediction of corrosion rates comes into play in pipe design, for example by informing the choice of materials for the pipelines, determining pipe geometry (wall thickness, etc.), determining whether to implement a corrosion inhibition program and, if so, selecting the corrosion inhibitor, determining whether to include a corrosion monitoring system, and also designing the inspection strategy to be deployed, to name several examples. As known in the art, constant and rigorous inspection of pipe wall thickness loss is not practical, if in fact possible. In the pipeline context, corrosion rate prediction can be used in determining the frequency (temporal and spatial) of sampled pipeline inspection by way of radiography (RT) and ultrasonic testing (UT), or the temporal frequency at which "in-line inspection" (ILI) is carried out. After construction and during operation, accurate prediction of the corrosion rates can be used in risk assessment of the corrosion hazard for the piping system, for example by modeling the corrosion. Such modeling, based on predictions of corrosion rate, can also be used to determine and quantify changes in the corrosion risk over time, and as a function of location within the piping system.

A simple conventional approach to the prediction of aqueous phase $CO_2$ corrosion rates simply relied on a "rule of thumb". It is known that the concentration of aqueous phase $CO_2$ corrosion depends on the equilibrium partial pressure of the gas phase $CO_2$. A conventional rule of thumb for $CO_2$ corrosion rate is based on this partial pressure: if the $CO_2$ partial pressure exceeds 2 bar, "severe" corrosion is indicated; if the $CO_2$ partial pressure is between 0.5 and 2 bar, corrosion may occur; if the $CO_2$ partial pressure is below 0.5 bar, a non-corrosive situation is indicated.

Besides lacking precision in its determination of corrosion rate, such a "rule of thumb" model does not account for many factors that affect the actual corrosion rate. For example, it is known that the corrosion rate is more sensitive to the thermodynamic activity of $CO_2$ in the aqueous phase than to its concentration; this activity is linked to the fugacity of the $CO_2$ in its gas phase, which varies non-ideally with partial pressure. Environmental parameters that affect $CO_2$ corrosion rate include water cut, characteristics of the hydrocarbon (particularly the chemical and physical mechanisms by which oil inhibits corrosion of steel), water chemistry and the source of the water in the pipe contents, iron content and solubility in the corrosive medium, the extent of corrosivity of the brine such as acetate-enhanced corrosion, the pH of the pipe contents, temperature, the presence of iron carbonate scale on the inner surface of the pipe, the presence of other reagents such as $H_2S$, and the like. Metallurgical factors, such as the alloy composition and microstructure of the pipeline material, also significantly affect the corrosion rate. Hydrodynamic parameters of the fluid being carried by the pipeline also play a role. Such hydrodynamic parameters include the flow rate and also the flow "regime" (e.g., slug flow, stratified flow, annular flow, etc.), locations of enhanced corrosion due to water "drop out" (i.e., at locations where water local accumulates, such as at dead legs or at direction or inclination changes), and flow disturbances that change turbulence in the flow. The inherent non-uniformity of corrosion of pipe interior surfaces also complicates the prediction of corrosion rate: corrosion often appears as pitting, or mesa-type attack, or as flow-induced localized corrosion that begins at pits or mesa attack sites. The "rule of thumb" model obviously does not begin comprehend such variations in corrosion rate.

Empirical models of $CO_2$ corrosion are well-known in the art. A popular empirical model is based on the equation or nomogram described in de Waard et al., "Prediction of Carbonic Acid Corrosion in Natural Gas Pipelines", *First International Conference on the Internal and External Protection of Pipes*, Paper F1 (Cranfield, UK: BHRA Fluid Engineering, 1975). The original de Waard model used temperature and $CO_2$ partial pressure to predict $CO_2$ corrosion rate based on small-scale laboratory experiments. In recent years, this empirical model has been expanded to include correction factors based on various other parameters, including pH, corrosion product scale on the pipeline interior, fluid velocity, steel composition, water cut, and the like. It has been observed, however, that recent incarnations of such empirical models do not completely or accurately account for protectiveness of pipe material by corrosion product scale, especially at high temperature or high pH, as the model is intended to apply only in the absence of formation water (which can break down the corrosion film). Oil wetting is typically included in this model as an "on/off" factor, for example by assuming, for crude oil pipelines (i.e., no condensate), oil wetting and thus no corrosion for water cut below 30% and liquid velocity above 1 msec. Despite these limitations, the de Waard model, as enhanced in recent years, remains in widespread use, for example as described in Hedges et al., "The Role of Acetate in CO2 Corrosion: the Double Whammy", *CORROSION/99*, Paper No. 21, (Houston, Tex.: NACE International, 1999).

By way of further background, corrosion models based on modeling specific corrosion mechanisms are known in the art. An early example of such a "mechanistic" corrosion model is described in Gray et al., "Mechanism of carbon steel corrosion in brines containing dissolved carbon dioxide at pH 4, *CORROSION/1989* Paper No. 464, (Houston, Tex.: NACE International, 1989), which derived an electrochemical model of four redox reactions under varying types of kinetic control. This electrochemical model uses mixed potential theory to predict polarization curves, based on calculated Tafel constants and exchange current densities, and ultimately based on corrosion rates of the system.

Another model, described in Nesic et al., "An electrochemical model for prediction of corrosion of mild steel in aqueous carbon dioxide solutions. *Corrosion,* 52 (1996), pp. 280 et seq., is based on individual electrochemical reactions in a water-$CO_2$ system, over a wide range of pH, temperature, partial pressure, and fluid velocity conditions, assuming no protective film. This is based on four cathodic reactions, and a single anodic reaction of iron dissolution. Transport processes are treated, in this model, in a simplified manner by assuming independent diffusion of each reactive species, and by using mass-transfer coefficients for the hydrodynamic systems of a rotating cylinder (for laboratory tests) and pipe flow.

Another mechanistic model is described in Nordsveen et al., "A Mechanistic Model for Carbon Dioxide Corrosion of Mild Steel in the Presence of Protective Iron Carbonate Films—Part 1: Theory and Verification", *Corrosion*, Vol. 59, No. 5 (2003). In this model, electrochemical reactions at the steel surface, diffusion of species between the metal surface and the bulk including diffusion through porous surface films, migration due to establishment of potential gradients, and heterogeneous chemical reactions including precipitation of surface films, are all considered. As a result, this model has been observed to predict corrosion rate, and concentration and flux profiles for the species of interest. This approach models heterogeneous chemical reactions (e.g., precipitation of surface films), electrochemical reactions at the steel surface, and transport of species to and from the bulk (e.g., convection and diffusion through the boundary layer and the porous surface films, migration as a result of the establishment of potential gradients). The MULTICORP software package, developed by Ohio University, implements this model approach using fundamental physicochemical laws and corresponding equations; equation parameters such as equilibrium constants, reaction rate constants, and diffusion coefficients, are taken from the open literature or are based on experimental data.

It has been observed that these conventional mechanistic models are complex to implement in practice. This complexity derives from the specialized computer software that is required for numerical solution of the complex and interrelated mathematical equations.

BRIEF SUMMARY OF THE INVENTION

It is therefore an object of this invention to provide a system and method in which a predicted corrosion rate for a pipe can be estimated in an automated and efficient manner.

It is a further object of this invention to provide such a system and method in which the contributions of various corrosion mechanisms can be determined.

It is a further object of this invention to provide such a system and method that can be used in efficiently designing pipeline systems.

It is a further object of this invention to provide such a system and method that can be used to evaluate the effects of operating changes in pipeline systems and downhole casing.

Other objects and advantages of this invention will be apparent to those of ordinary skill in the art having reference to the following specification together with its drawings.

The present invention may be implemented into a computer system and an automated method operating on such a computer system that evaluates a plurality of mechanistic corrosion models based on parameter values for a pipeline or downhole casing under evaluation. The system and method determine a corrosion rate by balancing the sum of cathodic corrosion reactions with an anodic reaction corresponding to iron dissolution. The corrosion rate can then be applied to additional automated models, if desired, to determine the effects of secondary factors such as the possibility of scale formation and the effectiveness of corrosion inhibitors.

BRIEF DESCRIPTION OF THE SEVERAL VIEWS OF THE DRAWING

FIG. 5 is an illustration of an input computer screen by way of which measurements can be input into the system of FIG. 2, according to that embodiment of the invention.

FIG. 9 is an illustration of an output computer screen by way of which the results of the operation of calculating a bare steel corrosion rate according to this embodiment of the invention can be displayed.

FIG. 10 is an illustration of an output computer screen by way of which the results of the operation of calculating a bare steel corrosion rate and the effects of corrosion inhibitor treatment, according to this embodiment of the invention, can be displayed.

DETAILED DESCRIPTION OF THE INVENTION

The present invention will be described in connection with its embodiments, one of which is described herein in connection with a method and system for predicting pipe corrosion rates. These embodiments will be described in this specification in the context of predicting pipeline corrosion rates in a production field and system for oil and gas, to assure the integrity of those pipelines and to facilitate efficient maintenance of the system, and in the context of predicting corrosion rates for metallic (e.g., carbon steel) downhole casing in oil and gas wells. However, it is contemplated that this invention can also provide important benefits in other applications, including, for example, pipeline corrosion rate prediction for other applications such as water and sewer systems, natural gas distribution systems on the customer side, and factory piping systems, to name a few. Accordingly, it is to be understood that the following description is provided by way of example only, and is not intended to limit the true scope of this invention as claimed.

Figure 1:
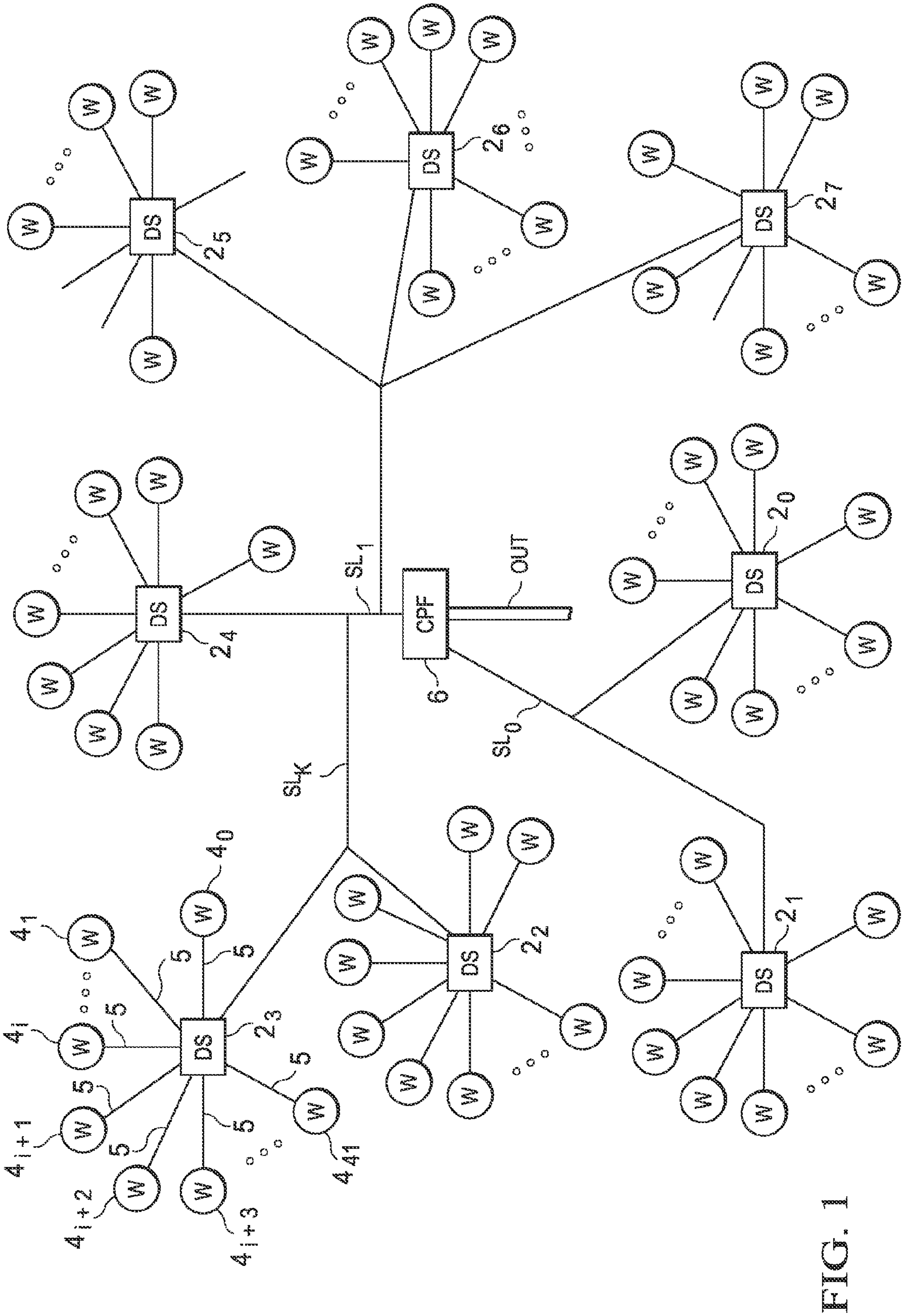
FIG. 1 is a schematic diagram of an example of a production field in connection with which the preferred embodiment of the invention may be used.

Referring first to FIG. 1, an example of an oil and gas production field, including wells and surface facilities, in connection with which an embodiment of the invention may be utilized, is illustrated in a simplified block form. In this example, the production field includes many wells W, deployed at various locations within the field, from which oil and gas products are produced in the conventional manner. While a number of wells W are illustrated in FIG. 1, it is contemplated that modern production fields in connection with which the present invention may be utilized will include many more wells than those wells W depicted in FIG. 1. In this example, each well W is connected to an associated drill site 2 in its locale by way of a pipeline 5. By way of example, eight drill sites $\mathbf{2}_0$ through $\mathbf{2}_7$ are illustrated in FIG. 1; it is, of course, understood by those in the art that many more than eight drill sites 2 may be deployed within a production field. Each drill site 2 may support many wells W; for example drill site $\mathbf{2}_3$ is illustrated in FIG. 1 as supporting forty-two wells $\mathbf{4}_0$ through $\mathbf{4}_{41}$. Each drill site 2 gathers the output from its associated wells W, and forwards the gathered output to processing facility 6 via one of pipelines SL. Eventually, processing facility 6 is coupled into an output pipeline OUT, which in turn may couple into a larger-scale pipeline facility along with other processing facilities 6.

In real-world oil production, the pipeline system partially shown in FIG. 1 would connect into a larger pipeline system, along with many other wells W, drilling sites 2, pipelines 5, SL, OUT, and processing facilities 6. Some pipeline systems include thousands of individual pipelines that are interconnected into an overall production and processing system. While not suggested by the schematic diagram of FIG. 1, in actuality, pipelines 5, SL, OUT vary widely from one another in construction and geometry. As such, the pipeline system illustrated in FIG. 1 represents a miniscule portion of a typical overall production pipeline system, in a highly simplified manner.

Corrosion risk affects the design of a pipeline system, particularly in selecting the suitable pipeline material, selecting the appropriate pipeline wall thickness, and deciding whether to utilize a corrosion inhibitor chemical. Once in production, changes in the operating conditions and pipeline contents can also affect corrosion rates, and thus corrosion risk ought to be considered during operation, particularly in deciding whether to implement operational changes. Corrosion risk also affects the design and operation of the downhole casing in wells W in the production system shown in FIG. 1. As known in the art, metallic piping (typically of low alloy steel, for example) is commonly used for the production casing of oil and gas wells, and as such is vulnerable to corrosion, especially considering the severity of downhole environmental conditions. Factors that determine the corrosion risk in each of these applications include the predicted uninhibited corrosion rates, efficiency and availability of proposed corrosion inhibitor chemicals, the likelihood of localized corrosion (pitting, erosion, etc.), and the like. These corrosion-related factors are then considered in the overall pipeline cost equation, including cost per unit thickness of the pipeline material, the cost of corrosion inhibitors at the expected dosages, etc. in order to optimize the best pipeline performance in terms of cost and reliability.

Expected corrosion rates are also important in maintaining existing pipelines and downhole casing. Accurate prediction of corrosion rate can be calibrated with actual direct or indirect measurement of pipeline wall thickness loss due to corrosion, and used to derive and execute an optimal pipeline maintenance and measurement program.

Those skilled in the art having reference to this specification will thus comprehend that these important design and maintenance activities are dependent upon an accurate prediction of corrosion rate.

However, many factors can significantly affect corrosion rate. These factors include the pipe material itself (e.g., carbon steel, corrosion resistant alloys, etc.), and the geometry of the pipeline and the overall system. In addition, the properties of the contents (i.e., liquids, gases, solids such as sand, scale, or others, or combinations of these fluids and solids) carried by the pipelines and casing can vary widely, such properties including composition, pressure, temperature, flow rate, and the like. As known in the art, these factors and properties can significantly affect the rate at which the pipeline material corrodes. In order to properly design and maintain a production and pipeline system, it is important to understand the corrosion rates of the casing and pipelines, taking these variations in construction, geometry, contents, operating and environmental conditions, and the like into account. As discussed above in connection with the Background of the Invention, accurate corrosion rate prediction in light of these various factors and properties, and variations thereof, has proven to be difficult.

According to the embodiments of this invention, a mechanistic model is defined and evaluated in order to derive expected corrosion rates that account for a wide range of factors that are known to affect corrosion. In addition, according to the embodiments of this invention, this mechanistic model allows for evaluation of individual corrosion mechanisms, thus providing additional insight into the cause of corrosion for a particular installation, and as a result enabling the selection of the appropriate strategy for reducing or compensating for that mechanism. Furthermore, the mechanistic model of these embodiments of the invention is evaluated in an automated manner by way of modern computer systems and functionality, enabling accurate and efficient evaluation of existing pipelines as well as proposed designs.

Figure 2:
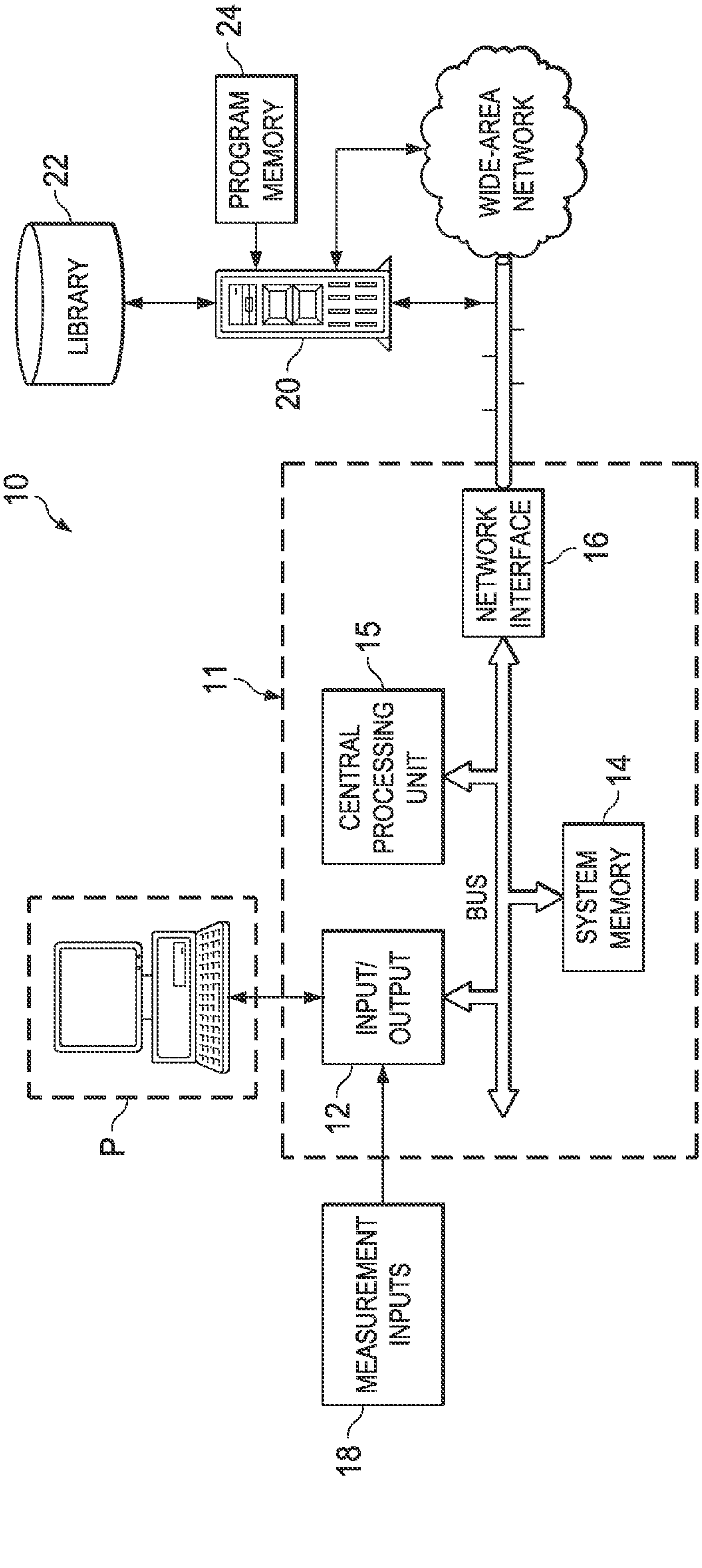
FIG. 2 is an electrical diagram, in block form, of a prediction system, in the form of a computer system, programmed to carry out an embodiment of the invention.

FIG. 2 illustrates the construction of prediction system 10 according to an example of an embodiment of the invention, which performs the operations described in this specification to predict $CO_2$ corrosion rates of pipes or piping (for purposes of this description, such terms refer to tubing, pipelines, or downhole casing). In this example, prediction system 10 is as realized by way of a computer system including workstation 11 connected to server 20 by way of a network. Of course, the particular architecture and construction of a computer system useful in connection with this invention can vary widely. For example, prediction system 10 may be realized by a single physical computer, such as a conventional workstation or personal computer, or alternatively by a computer system implemented in a distributed manner over multiple physical computers. Accordingly, the generalized architecture illustrated in FIG. 2 is provided merely by way of example.

As shown in FIG. 2 and as mentioned above, prediction system 10 includes workstation 11 and server 20. Workstation 11 includes central processing unit 15, coupled to system bus BUS. Also coupled to system bus BUS is input/output interface 12, which refers to those interface resources by way of which peripheral functions P (e.g., keyboard, mouse, display, etc.) interface with the other constituents of workstation 11. Central processing unit 15 refers to the data processing capability of workstation 11, and as such may be implemented by one or more CPU cores, co-processing circuitry, and the like. The particular construction and capability of central processing unit 15 is selected according to the application needs of workstation 11, such needs including, at a minimum, the carrying out of the functions described in this specification, and also including such other functions as may be desired to be executed by computer system. In the architecture of prediction system 10 according to this example, system memory 14 is coupled to system bus BUS, and provides memory resources of the desired type useful as data memory for storing input data and the results of processing executed by central processing unit 15, as well as program memory for storing the computer instructions to be executed by central processing unit 15 in carrying out those functions. Of course, this memory arrangement is only an example, it being understood that system memory 14 may implement such data memory and program memory in separate physical memory resources, or distributed in whole or in part outside of workstation 11. In addition, as shown in FIG. 2, measurement inputs 18 that are acquired from laboratory or field tests and measurements, or as design parameters, are input via input/output function 12, and stored in a memory resource accessible to workstation 11, either locally or via network interface 16.

Network interface 16 of workstation 11 is a conventional interface or adapter by way of which workstation 11 accesses network resources on a network. As shown in FIG. 2, the network resources to which workstation 11 has access via network interface 16 includes server 20, which resides on a local area network, or a wide-area network such as an intranet, a virtual private network, or over the Internet, and which is accessible to workstation 11 by way of one of those network arrangements and by corresponding wired or wireless (or both) communication facilities. In this embodiment of the invention, server 20 is a computer system, of a conventional architecture similar, in a general sense, to that of workstation 11, and as such includes one or more central processing units, system buses, and memory resources, network interface functions, and the like. According to this embodiment of the invention, server 20 is coupled to program memory 24, which is a computer-readable medium storing executable computer program instructions according to which the operations described in this specification are carried out by prediction system 10. In this embodiment of the invention, these computer program instructions are executed by server 20, in the form of a "web-based" application, upon input data communicated from workstation 11, to create output data and results that are communicated to workstation 11 for display or output by peripherals P in a form useful to the human user of workstation 11. In addition, library 22 is also available to server 20 (and perhaps workstation 11 over the local area or wide area network), and stores model calculations, previous model results, actual corrosion measurements for correlation with the corrosion models, and other archival or reference information useful in prediction system 10. Library 22 may reside on another local area network, or alternatively be accessible via the Internet or some other wide area network. It is contemplated that library 22 may also be accessible to other associated computers in the overall network.

Of course, the particular memory resource or location at which the measurements, library 22, and program memory 24 physically reside can be implemented in various locations accessible to prediction system 10. For example, these data and program instructions may be stored in local memory resources within workstation 11, within server 20, or in network-accessible memory resources to these functions. In addition, each of these data and program memory resources can itself be distributed among multiple locations, as known in the art. It is contemplated that those skilled in the art will be readily able to implement the storage and retrieval of the applicable measurements, models, and other information useful in connection with this embodiment of the invention, in a suitable manner for each particular application.

According to this embodiment of the invention, by way of example, system memory 14 and program memory 24 store computer instructions executable by central processing unit 15 and server 20, respectively, to carry out the functions described in this specification, by way of which an estimate of the predicted rate of corrosion for pipeline or downhole casing can be generated. These computer instructions may be in the form of one or more executable programs, or in the form of source code or higher-level code from which one or more executable programs are derived, assembled, interpreted or compiled. Any one of a number of computer languages or protocols may be used, depending on the manner in which the desired operations are to be carried out. For example, these computer instructions may be written in a conventional high level language, either as a conventional linear computer program or arranged for execution in an object-oriented manner. These instructions may also be embedded within a higher-level application. For example, in one embodiment of the invention, an executable web-based application resident in program memory 24, accessible to server 20 and client computer systems such as workstation 11, receives inputs from the client system in the form of an EXCEL spreadsheet, executes Visual Basic for Algorithms (VBA) modules at a web server, and provides output to the client system also in the form of an EXCEL spreadsheet. This spreadsheet-based input and output to a web application is beneficial because of the relatively low level of user training that is required for operation, and because of the security and maintainability of the application residing at a web server. It is contemplated that those skilled in the art having reference to this description will be readily able to realize, without undue experimentation, this embodiment of the invention in a suitable manner for the desired installations. Alternatively, these computer-executable software instructions may be resident elsewhere on the local area network or wide area network, or downloadable from higher-level servers or locations, by way of encoded information on an electromagnetic carrier signal via some network interface or input/output device. The computer-executable software instructions may have originally been stored on a removable or other non-volatile computer-readable storage medium (e.g., a DVD disk, flash memory, or the like), or downloadable as encoded information on an electromagnetic carrier signal, in the form of a software package from which the computer-executable software instructions were installed by prediction system 10 in the conventional manner for software installation.

Figure 3:
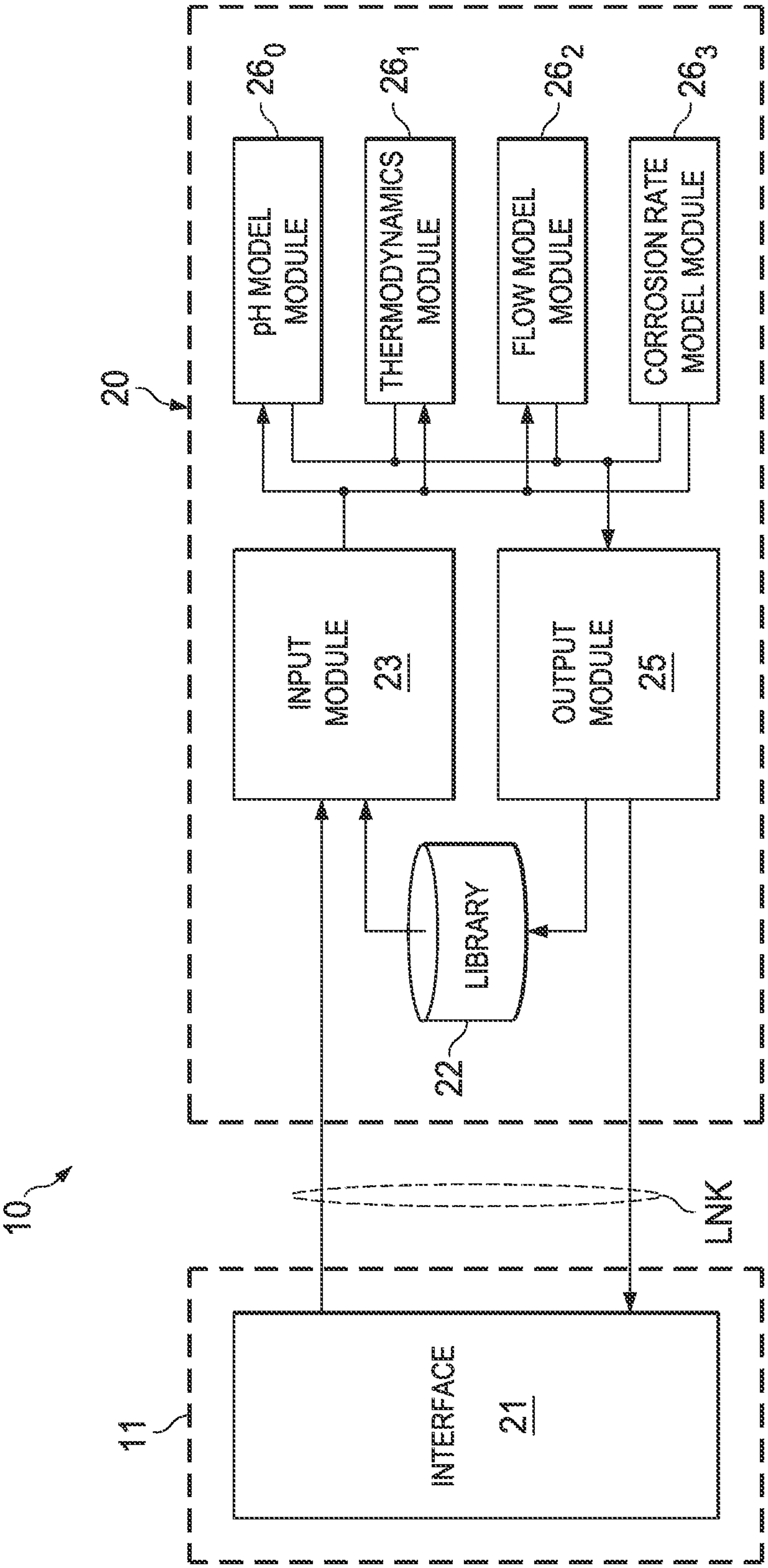
FIG. 3 is a software diagram, in block form, of the arrangement of software modules in the computer system of FIG. 2, according to that embodiment of the invention.

FIG. 3 illustrates, by way of example, the arrangement of various software modules executable by prediction system 10 according to this embodiment of the invention. The arrangement of FIG. 3 corresponds to an implementation of the software of prediction system 10 as a "web application", in that the executable software resides and is executed on a server, in response to commands and input data forwarded over a network (wired or wireless LAN or WAN) from a client system. In this example, workstation 11 is the client system, while the bulk of the software functionality resides and is executed on server 20, with communications link LNK illustrated as the communications facility and protocol by which the two physical computers communicate with one another.

In this arrangement, workstation 11 executes interface 21, by way of which data and model results will be communicated from and to the user according to this embodiment of the invention. Interface 21 is preferably realized by way of conventional computer software applications, for example as a worksheet within the EXCEL spreadsheet program, as a web page within a conventional Internet browser application, or a combination of the two (spreadsheet worksheet operating within a frame or web page in the browser application). As will be evident below, this interface 21 can be realized as a window in which an array of input values can be entered by the user, and in which an array of output values can be displayed. The browser or other application within interface 21 operates to format the input data entered by the user, and to communicate that data and any control signals or commands to input module 23, which is resident on and executed by server 20.

It is contemplated that those skilled in the art having reference to this specification will be readily able to program input module 23 and output module 25, to carry out the functions of forwarding data among the various functional modules and interfaces. As known in the art, and according to conventional or rudimentary techniques, modules 23, 25 will comprehend the particular formats of data to be forwarded among the various functional modules and interfaces. According to this embodiment of the invention, input module 23 and output module 25 are executed by server 20 to communicate data to and from software modules 26 that, when executed, apply the data to various models, according to which predicted corrosion rates and other parameters are determined. In this embodiment of the invention, these modules include pH model module $\mathbf{26}_0$, thermodynamics model module $\mathbf{26}_1$, flow model module $\mathbf{26}_2$, and corrosion rate model module $\mathbf{26}_3$. Model modules $\mathbf{26}_0$, $\mathbf{26}_1$, $\mathbf{26}_2$, $\mathbf{26}_3$ (collectively referred to as model modules 26) may be programmed in a higher level programming language, for example as Visual Basic modules, resident at server 20 and callable in order to execute their functions on data presented thereto by input module 23, with the results of such executed presented by each of model modules 26 to output module 25. Output module 25 is programmed to forward the results forwarded to it by one or more of model modules 26 over communications link LNK, for display to the user at workstation 11 via interface 21. In this fashion, output module 25 may also communicate various status messages to workstation 11, such messages including error indicators if an error occurred during the operation of any of modules 23, 25, 26, or if an out-of-range result was produced by model modules 26, and the like. These results and status indicators may also be stored at library 22, for later application to model modules 26 by input module 23 as may be appropriate for a particular modeling operation, under commands from workstation 11 or the like.

Figure 4:
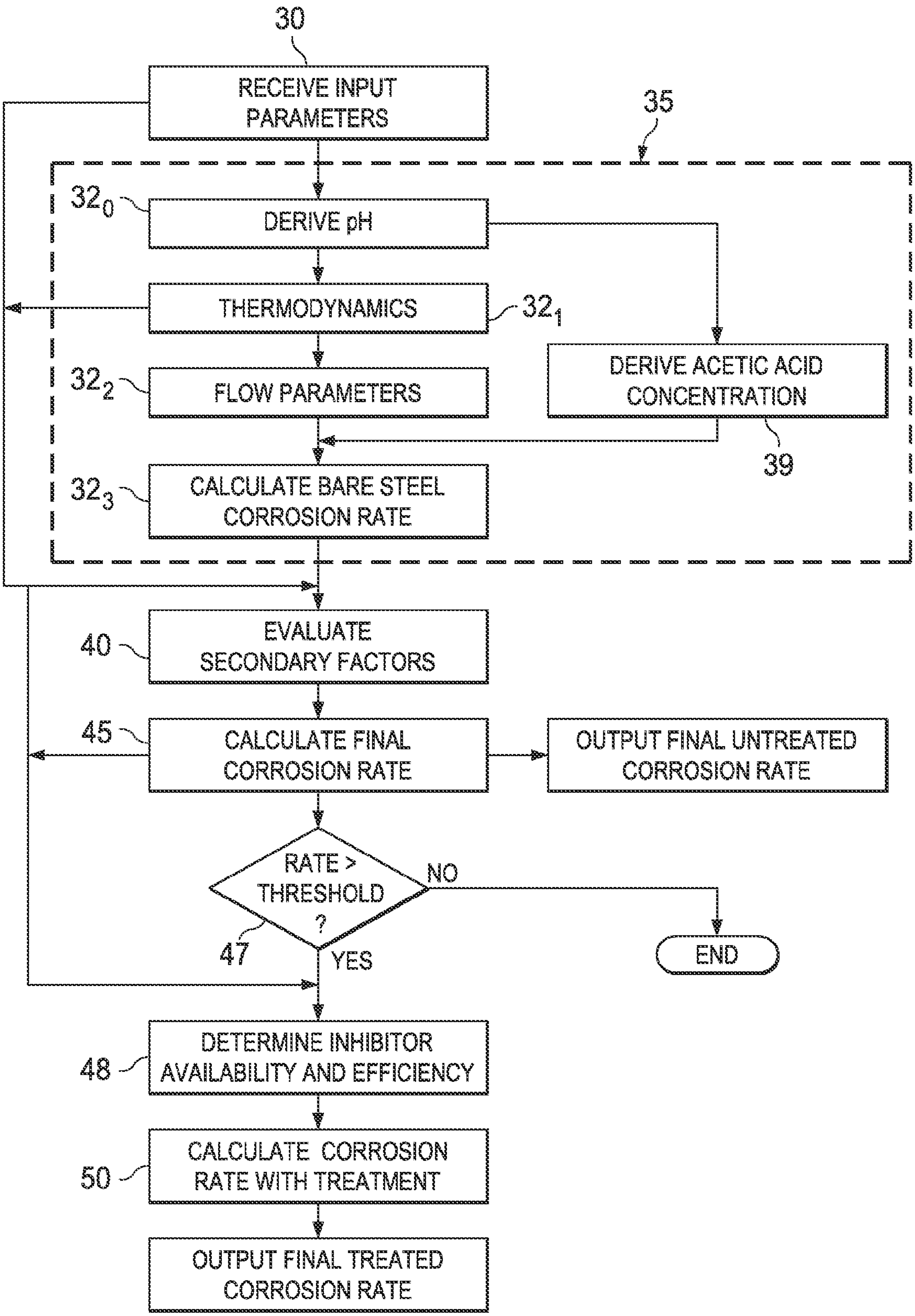
FIG. 4 is a flow diagram illustrating the operation of the system of FIG. 2 according to that embodiment of the invention.

Referring now to FIG. 4, the overall general operation of a method of estimating corrosion rates according to an embodiment of the invention will now be described. The steps and operations carried out in this method, as shown in FIG. 4 according to this embodiment of the invention, will be described as carried out by prediction system 10 of FIG. 2, and the software architecture of FIG. 3. The particular hardware and software architecture used to realize prediction system 10 for performing the estimation of corrosion rates according to this embodiment of the invention is presented by way of example only. Variations to such architecture and operational arrangement will be apparent to those skilled in the art having reference to this specification, and are contemplated to be within the scope of this invention.

The operation of prediction system 10 according to this embodiment of the invention begins with the receipt of input parameter values, in process 30, corresponding to those parameters upon which the various model modules 26 operate to derive a predicted corrosion rate and other results. It is contemplated that these input parameter values will typically be entered by a user at workstation 11, via the appropriate data entry interface 21 executed thereat. Alternatively, it is contemplated that some or all of these input parameter values may be retrieved from data storage, for example from library 22, under command by the user. Still further in the alternative, it is contemplated that some of these input parameter values may be direct measurement from laboratory or field measurement sensors, communicated via workstation 11 or otherwise to input module 23 of server 20, in this embodiment of the invention.

FIG. 5 illustrates an example of entry window 41 containing a spreadsheet page by way of which input parameter values are entered by a user at workstation 11, or alternatively retrieved from memory such as library 22, according to this embodiment of the invention. As shown in FIG. 5, multiple "cases" can be modeled according to this embodiment of the invention, each "case" corresponding to a separate and independent set of input parameter values to be applied to the various models. In this manner, the user can perform a "what-if" analysis by varying one or more of the input parameter values from case-to-case, applying the cases to the models, and comparing the resulting predicted corrosion rates and the like.

According to this embodiment of the invention, the input parameters values received in process 30 include water chemistry parameter values, and also physical parameter values descriptive of the pipe and flow environment to be modeled. The water chemistry parameter values received in process 30, according to this embodiment of the invention and as shown in FIG. 5, include ionic concentrations of chloride (Cl), sulfate ($SO_4$), barium (Ba), calcium (Ca), strontium (Sr), magnesium (Mg), sodium (Na), potassium (K), bicarbonate ($HCO_3$), iron (Fe), and acetate (Ac); in the example of FIG. 5, these ionic concentrations are expressed as milligrams/liter or parts per million. For instances in which the parameters of bicarbonate and acetate correspond to actual measurements of these reactants, it is important to ensure that the measurements are validly determined. One simple way to measure bicarbonate concentration is by measuring alkalinity of the solution. However, it is known that alkalinity is representative of bicarbonate concentration only if the only bases in solution result from carbonate equilibria; this is typically not the case in production "brines" encountered in oil and gas production, because other anions, such as acetates, that also affect alkalinity are often present. As such, it is useful to quantify concentrations of all anions, in order to determine bicarbonate concentration from total alkalinity.

The physical input parameter values received in process 30 include values for parameters such as system temperature, total gas pressure (i.e., the prevailing local pressure in the gas of a multiphase system being conveyed by the pipeline), $CO_2$ concentration in the gas phase, $H_2S$ concentration in the gas, the concentration of dissolved oxygen in the water phase, flow rates of each of the phases (gas, oil, water), internal diameter of the tubing or pipeline, angle of inclination of the tubing or pipeline from the horizontal, an indication of whether the water present in the system is condensed water or produced water, and the specific gravity of each phase (gas, oil, water).

It is contemplated, of course, that values of other parameters may also be received in process 30, depending of course on the inputs required by each model module 26 to be evaluated; of course, any parameters not used by the modules may be omitted. In any event, the input parameters received in process 30, for example via input window 41, are forwarded to the appropriate ones of model modules 26 for evaluation of the particular models upon user command.

According to this embodiment of the invention, modeling processes $\mathbf{32}_0$, $\mathbf{32}_1$, $\mathbf{32}_2$, $\mathbf{32}_3$ are performed by the corresponding model modules $\mathbf{26}_0$, $\mathbf{26}_1$, $\mathbf{26}_2$, $\mathbf{26}_3$, within Level I model process 35. The particular order in which model modules 26 carry out their corresponding modeling process 32 is not of particular importance, except to the extent that a modeling process $\mathbf{32}_x$ requires, as an input, an output of one or more of the other modeling processes $\mathbf{32}_y$. Indeed, if sufficient computational capacity is provided within server 20, modeling processes 32 may be carried out in parallel to at least some extent.

In the example of FIG. 4, pH modeling process $\mathbf{32}_0$ calculates an in-situ pH value based on some of the input parameters received in process 30, which were forwarded to model module $\mathbf{26}_0$ via interface 21 and input module 23. According to this embodiment of the invention, pH model module $\mathbf{26}_0$ derives this pH value based on the received ionic concentration parameter values, summed together, and then by balancing the resulting charge with sodium or chloride ions as the case may be. In one embodiment of this invention, pH model module $\mathbf{26}_0$ can be realized as an add-in function within the EXCEL spreadsheet program, implemented either at server 20 in the manner illustrated in FIG. 3, or at workstation 11 as part of interface 21, with its results forwarded to server 20. Other realizations of pH model module $\mathbf{26}_0$ are also contemplated. An example of the calculations realized by pH model module $\mathbf{26}_0$ is the well-known "PHREEQC-2" or "PHREEQC for Windows", model software code published by the United States Geological Survey (http://www.geo.vu.nl/users/posv/phreeqc/index.html), modified to include the effects of acetic acid or acetates from cooperative process 39 in the manner described above.

According to this embodiment of the invention, cooperative process 39 receives the in-situ pH value calculated in process $\mathbf{32}_0$, and calculates a free acetic acid concentration (HAc). According to this embodiment of the invention, process 39 receives the acetate concentration (Ac) input parameter value, and considers this acetate concentration value to be acetic acid if the condensed water value is "yes" or if the bicarbonate concentration ($HCO_3$) is below 10 ppm; otherwise, the acetate concentration is treated as acetate only. In either event, process 39 calculates the undissociated, or free, acetic acid concentration, in response to the in-situ pH and according to the acetate vs. acetic acid determination described above. As will be described below in further detail, this free acetic acid concentration is used in the determination of the bare steel corrosion rate.

Within Level I corrosion model process 35, thermodynamics modeling process $\mathbf{32}_1$ is performed by thermodynamics model module $\mathbf{26}_k$, to determine one or more thermodynamic values and equilibrium constants based on the input parameter values received in process 30 via interface 21 and input module 23. As known in the art, the corrosion of iron produces iron ions (e.g., $Fe^{2+}$) that react with other reactants in the fluid to form a scale, such as iron carbonate, on the inner surface of the tubing or pipeline. Such scale provides some measure of corrosion protection. It has been observed that the formation of scale, such as iron carbonate, is highly dependent on temperature. As such, consideration of the formation of scale is a significant factor in predicting an eventual corrosion rate, and as such the determination of anticipated temperature in the tubing or pipeline and thus the determination of whether scale will form in the modeled conditions indicated by the input parameter values, are important. According to this embodiment of the invention, thermodynamics model module $\mathbf{26}_1$ determines a scaling temperature $T_s$ from a "rule of thumb" approach, substantially as used in the de Waard model discussed above, which determines the scale temperature primarily from the ionic concentration of carbon dioxide in the fluid:

$$T_S = \frac{2400}{0.44\log(f_{CO_2}) + 6.7} - 273$$

where $f_{CO2}$ is the ionic concentration of carbon dioxide entered in process 30. In this example, the scaling temperature $T_s$ is then compared against the temperature parameter value entered as one of the physical parameters in process 30. It is of course contemplated that other approaches to deriving this scaling temperature $T_s$ and other secondary factors will be or become apparent to the skilled reader having reference to this embodiment of the invention. The resulting scaling temperature $T_s$ and such other secondary factors are then forwarded to secondary factor evaluation process 40 for possible incorporation into a final corrosion rate, as will be described below.

Flow parameter modeling process $\mathbf{32}_2$ is performed by flow model module $\mathbf{26}_2$ within Level I corrosion model process 35, also based on the input parameter values received in process 30 via interface 21 and input module 23. According to this embodiment of the invention, flow parameter modeling process $\mathbf{32}_2$ generates estimates of the hydraulic diameter of the modeled tubing or pipeline, the in-situ liquid velocity, and also an indication of the flow regime (annular, slug, stratified, etc.) in the modeled tubing or pipeline. According to this embodiment of the invention, flow model module $\mathbf{26}_2$ applies various known correlation relationships that predict black oil physical properties for typical temperature and pressure conditions that are encountered in reservoir and well applications, based on certain assumptions regarding gas/oil ratio. These known correlation relationships that are utilized by flow model module $\mathbf{26}_2$ according to this embodiment of the invention include the Glaso correlation for predicting solution gas-oil ratio and oil formation volume factor prediction, as described in Glaso, "Generalized Pressure-Volume-Temperature Correlations", *J. Petroleum Tech.*, (SPE, 1980) pp 785-95; the Lee correlation for predicting gas viscosity, as described in Lee et al., "The Viscosity of Natural Gases", *J. Petroleum Tech.*, (SPE, 1966) pp. 997-1002; the Beggs and Robinson correlations for predicting liquid viscosity, as described in Beggs et al., "Estimating the Viscosity of Crude Oil Systems", *J. Petroleum Tech.* (SPE, 1975) pp. 1140-44; and the Baker and Swerdloff, and Hough, correlations for predicting surface tension, as described in Baker et al., "Finding Surface Tension of Hydrocarbon Liquids, *Oil and Gas Journal* (1956), pp. 96-104, and Hough et al., "Interfacial Tensions at Reservoir Pressures and Temperatures; Apparatus and the Water-Methane System", *Trans. AIME* (1951), pp. 57-60. The results of these correlations are then applied, by flow model module 26$_2$, into a mechanistic model for estimating liquid velocity and hydraulic diameter, according to a model selected according to other input parameter values. For example, in this embodiment of the invention, a model based on the Beggs and Robinson vertical upflow hydraulics, as described in Beggs et al., "A Study of Two-Phase Flow in Inclined Pipes", *J. Petroleum Tech.* (SPE, 1973) pp. 607-17, may be applied for tubing or pipeline having inclination angles of greater than 20°; while for inclination angles below 20°, a different model such as based on the Beggs and Brill pressure drop model for non-stratified flow, may be applied. It is contemplated that those skilled in the art having reference to this specification will be readily able to select and apply the appropriate correlations and models for determining flow parameters of interest and importance, using conventional modeling software, to the precision desired. In any event, the identification of flow regime output by flow model module 26$_2$ in process 32$_2$ will necessarily be somewhat imprecise and empirically-based, and as such it may be useful to analyze the results of process 32$_2$ to determine whether the flow parameter results indicate operation near a regime boundary, and if so, to evaluate the flow in both of the relevant regimes and choose the more conservative regime and results, for purposes of corrosion prediction.

As shown in FIGS. 3 and 4, Level I corrosion rate model process 35 includes bare steel corrosion rate calculation process 32$_3$, which is executed by corrosion rate model module 26$_3$ based on parameter values received in process 30 via interface 21 and input module 23. The theory of operation of bare steel corrosion rate process 32$_3$ will now be described in detail.

As discussed above, the prevalent corrosion reagent in oil and gas pipelines and downhole casing is aqueous phase carbon dioxide ($CO_2$). According to this embodiment of the invention, bare steel corrosion rate calculation process 32$_3$ is based on an electrochemical model of $CO_2$ corrosion. According to this embodiment of the invention, a predicted corrosion rate is determined by balancing the anodic reaction of iron dissolution (oxidation) with the sum of cathodic reduction reactions, each of which corresponds to a particular corrosion mechanism. In the electrochemical model of these reactions, the balancing of the reactions is accomplished by balancing anodic current $i_{Fe}$ with the sum of cathodic currents $i_C$:

$$i_{Fe} = \sum i_C$$

In one embodiment of this invention, the various cathodic currents $i_C$ include the following currents, each corresponding to a reduction mechanism:

$i_{(H+)}$: hydrogen ion reduction
$i_{(H2CO3)}$: carbonic acid reduction
$i_{(H2O)}$: water reduction
$i_{(H2O)}$: acetic acid reduction
$i_{(O2)}$: oxygen reduction The anodic reaction of iron dissolution is essentially under activation control (i.e., dependent on electropotential and temperature according to an activation energy). The cathodic reduction reactions are either under activation control, or under mixed control of activation and diffusion (mass transport of reactants) mechanisms, or of activation and hydration (limited by a hydration reaction rate) mechanisms. The control mechanisms pertaining to each of the oxidation and reduction reactions will be described in further detail below. Each of these reactions is characterized over a range of electropotential and current density, given the values of input parameters that control the corresponding oxidation or reduction mechanism. As known in the art, one can solve for the potential-current density point at which the anodic dissolution reaction balances with the sum of the cathodic reactions. The corrosion current density at that operating point is used by bare steel corrosion rate model process 32$_3$ to derive a predicted corrosion rate, according to this embodiment of the invention.

The relationship of each of the cathodic reduction reactions, and the anodic oxidation reaction, to electropotential and current density, for the reactions considered according to this embodiment of the invention, will now be described.

The cathodic current $i_{(H+)}$ for the mechanism of hydrogen ion reduction can be expressed as:

$$\frac{1}{i_{(H+)}} = \frac{1}{i_{\alpha(H+)}} + \frac{1}{i_{lim(H+),d}}$$

in other words, the reciprocal of the sum of the reciprocals of an activation current and a diffusion limiting current (d). The limiting current is due to mass transport to the corroding surface, and can be expressed as:

$$i_{lim(H+),d} = k_{m(HAc)} F C_{[H+],bulk}$$

where $k_{m(HAc)}$ is the mass transfer coefficient of the hydrogen ion, F is the Faraday constant and $C_{[H+],\ bulk}$ is the bulk $H^+$ concentration. The activation current can be expressed as:

$$i_{\alpha(H+)} = i_{0(H+)} 10^{\frac{\eta}{b_c}}$$

where $i_{0(H+)}$ is the exchange current density, A/m$^2$, $\eta$ is the overpotential, V, and $b_c$ is the cathodic Tafel slope for the reaction. Accordingly, the relationship of cathodic current $i_{(H+)}$ to electropotential (represented by overpotential $\eta$) and current density (represented by exchange current density $i_{0(H+)}$) for the mechanism of hydrogen ion reduction can be evaluated.

The cathodic current $i_{(H2CO3)}$ for the mechanism of carbonic acid reduction can also be expressed as the reciprocal of the sum of reciprocals of an activation current and a chemical reaction limiting current (r):

$$\frac{1}{i_{(H2CO3)}} = \frac{1}{i_{\alpha(H2CO3)}} + \frac{1}{i_{lim(H2CO3),r}}$$

For this reduction reaction, the limiting current depends on the reaction rate limit for the hydration reaction:

$$CO_2 + H_2O \leftrightarrow H_2CO_{3(aq)}$$

This limiting current can be expressed as:

$$i_{lim(H2CO3),r} = F C_{[CO2],bulk} (D_{H2CO3} K_{hyd} k_{hyd,f})^{0.5}$$

where $C_{[CO2],bulk}$ is the bulk concentration of dissolved carbon dioxide, $D_{H2CO3}$ is the diffusion coefficient for $H_2CO_3$, $K_{hyd,f}$ is the equilibrium constant for the $CO_2$ hydration reaction and $k_{hyd,f}$ is the forward reaction rate for the $CO_2$ hydration reaction. The activation controlled reaction cathodic current component $i_{\alpha(H2CO3)}$ can be expressed as:

$$i_{\alpha(H2CO3)} = i_{0(H2CO3)}10^{\frac{\eta}{b_c}}$$

similarly as the activation controlled current component in hydrogen ion reduction. Evaluation of these current components provides the relationship of electropotential to corrosion current density, for the conditions corresponding to the input parameter values, for the carbonic acid reduction reaction.

The cathodic current $i_{(H2O)}$ for the water reduction reaction is controlled by a charge-transfer process, given that water molecules at the corroding surface are effectively unlimited. As such, the expression of current component $i_{(H2O)}$ is:

$$i_{(H2O)} = i_{0(H2O)}10^{\frac{\eta}{b_c}}$$

The exchange current density $i_{0(H2O)}$ depends on temperature, but does not depend on pH value, for pH between 3 and 6. One can thus model this exchange current density $i_{0(H2O)}$ as follows:

$$\frac{i_{0(H2O)}}{i_{0(H2O)}^{ref}} = e^{\frac{\Delta H_{(H2O)}}{R}\left(\frac{1}{T}-\frac{1}{T_{ref}}\right)}$$

where the reference current $i_{0(H2O)}{}^{ref}$) can be considered to be 3E-5 A/m$^2$ at reference temperature $T_{ref}$=298 K. The value $\Delta H_{(H2O)}$ is the enthalpy of activation, expressed as kJ/mol. The potential-current density of water reduction cathodic current $i_{(H2O)}$ can thus be readily evaluated.

According to this embodiment of the invention, both carbonic acid and acetic acid, if present, are active as direct reductions in the corrosion of steel tubing or pipelines. The carbonic acid reduction reaction follows that described above, whether or not acetic acid is present. The reduction of free acetic acid direct to hydrogen can be expressed as:

$$2HAc+2e^- \rightarrow H_2+2Ac^-$$

The current density versus voltage equation for this reduction reaction can be expressed as the reciprocal of the sum of reciprocals of an activation current and a mass transfer (diffusion) limited current density:

$$\frac{1}{i_{(HAc)}} = \frac{1}{i_{\alpha(HAc)}} + \frac{1}{i_{lim(HAc),d}}$$

These current components can be expressed as:

$$i_{(HAc)} = i_{0(HAc)}10^{\frac{\eta}{b_c}}$$

and $$i_{lim(HAc),d} = k_{m,HAc}FC_{free,HAc}$$

where $k_{m,HAc}$ is the mass transfer coefficient of the acetic acid, and $C_{free,HAC}$ is the bulk undissociated (free) HAc concentration calculated in process 39. The exchange current density $i_{o(Hac)}$ depends on pH (from process 32$_0$), acetic acid concentration (process 39), and temperature, as follows:

$$\frac{i_{0(HAc)}}{i_{0(HAc)}^{ref}} = e^{\frac{\Delta H_{(HAc)}}{R}\left(\frac{1}{T}-\frac{1}{T_{ref}}\right)}\left(\frac{C_{H+}}{C_{H+,ref}}\right)^{-0.5}\left(\frac{C_{HAc}}{C_{HAc,ref}}\right)$$

As such, the electropotential-current density relationship for the mechanism of acetic acid reduction can be readily evaluated from the input parameter values received in process 30, and also the pH determined by process 32$_0$ in this example (or which may alternatively be entered by the user via interface 21).

According to this embodiment of the invention, the cathodic current due to the oxygen reduction reaction is considered to be controlled by both charge-transfer (activation) and also diffusion (mass transfer). One can express the current-voltage relationship of oxygen reduction as:

$$\frac{1}{i_{(O2)}} = \frac{1}{i_{\alpha(O2)}} + \frac{1}{i_{lim(O2),d}}$$

The diffusion limiting current component can be considered as:

$$i_{lim(O2),d}=4k_{m,O2}FC_{O2}$$

where $k_{m,O2}$ is the mass transfer coefficient (m/s), which can be determined by a conventional correlation of Sherwood, Reynolds, and Schmidt numbers for the environment. The $C_{O2}$ concentration is simply the bulk concentration of dissolved oxygen. The charge-transfer limited current component can be expressed as:

$$i_{(O2)} = i_{0(O2)}10^{\frac{\eta}{b_c}}$$

with the exchange current density $i_{0(O2)}$ dependent on temperature and pH, but not on the partial pressure of oxygen.

$$\frac{i_{0(O2)}}{i_{0(O2)}^{ref}} = e^{\frac{\Delta H_{(O2)}}{R}\left(\frac{1}{T}-\frac{1}{T_{ref}}\right)}\left(\frac{C_{H+}}{C_{H+,ref}}\right)^{-0.5}$$

As such, the appropriate current density expression for oxygen reduction can be readily derived, based on the received input parameter values and pH model process 32$_0$ in this example. By including the component of oxygen reduction in the bare steel corrosion rate model process 32$_3$, according to this embodiment of the invention, corrosion rate prediction becomes applicable to both the situation of seawater in the fluid being carried, and also the fluid of seawater comingled with produced water.

As discussed above, the anodic current density, to be balanced against the sum of these currents, is determined by the oxidation reaction of iron dissolution:

$$Fe \rightarrow Fe^{2+}+2e^-$$

In this embodiment of the invention, the iron dissolution reaction is under activation control only, with its electropotential-current density relationship following the well-known Tafel relationship:

$$i_{(Fe)} = i_{0(Fe)} 10^{\frac{\eta}{b_c}}$$

The exchange current density $i_{0(Fe)}$ for iron dissolution is temperature dependent only, and can be expressed as:

$$\frac{i_{0(Fe)}}{i^{ref}_{0(Fe)}} = e^{\frac{\Delta H_{(Fe)}}{R}\left(\frac{1}{T} - \frac{1}{T_{ref}}\right)}$$

Again, temperature $T_{ref}$ is 298K, with the activation energy $\Delta H_{(Fe)}$ expressed in kJ/mol.

It is contemplated that those skilled in the art having reference to this specification can readily determine the specific values of parameters and constants to be used in the relevant cathodic and anodic current density expressions for specific pipe systems being modeled according to embodiments of the invention, without undue experimentation.

According to this embodiment of the invention, as will be described in detail, corrosion rate model module 26$_3$ will carry out modeling process 32$_3$ by balancing the anodic current density $i_{(Fe)}$ against the sum of the cathodic currents from the mechanisms being considered. The operating point, in the electropotential-current density space, at which the anodic current balances with the sum of the cathodic currents provides a corrosion current density $i_{corr}$ at a calculated electropotential $E_{corr}$. According to known relationships, as will be described in further detail below, a predicted corrosion rate can be calculated from this corrosion current density $i_{corr}$, for assumed or stored values of the density of the steel, the molecular weight of iron, and the number of electrons exchanged in the electrochemical reaction.

According to this embodiment of the invention, the manner in which corrosion rate model module 26$_3$ carries out modeling process 32$_3$ follows the theory of operation described above. In the data flow diagram of FIG. 6, input parameter set 42 includes various input parameter values received in process 30. In addition, considering the manner in which some of the corrosion reduction reactions are characterized, as described above, the results of other processes within Level I corrosion rate model process 35 are also received and included in input parameter set 42. In this implementation, the pH value derived by modeling process 32$_0$ is received into parameter set 42, as is the free acetic acid concentration (HAc) from cooperative process 39. These input parameter values in set 42 will be applied to the various sub-processes 44, 46 for calculating current-voltage (electropotential-current density) relationships for each of the reduction and oxidation reactions, as will be described below. In addition, it is contemplated that various constants necessary in the evaluation of these current-voltage relationships will either be programmed into these sub-processes 44, 46, or retrieved by those sub-processes from library 22 or from some other memory or register resource.

Figure 6:
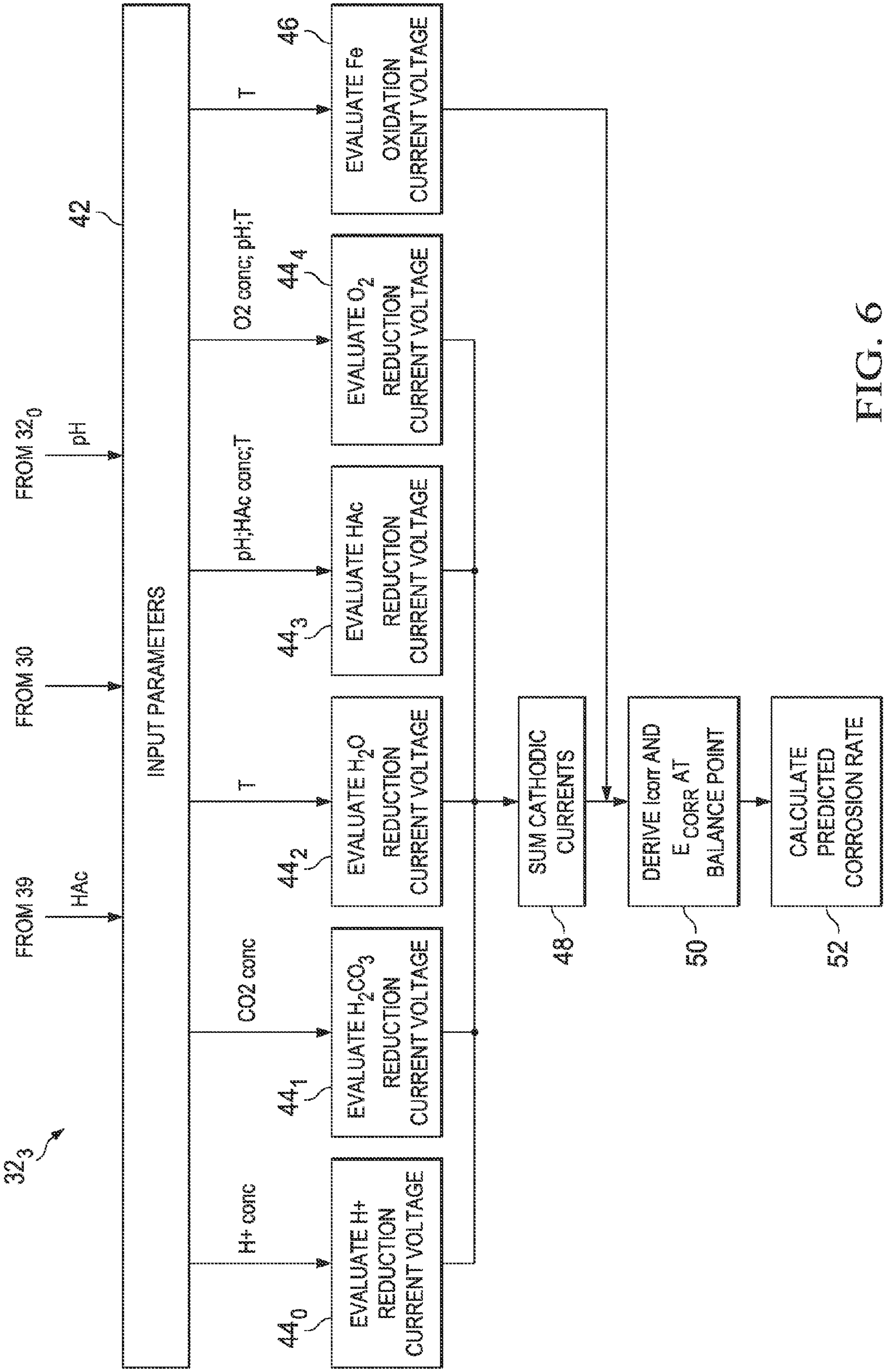
FIG. 6 is a flow diagram illustrating the operation of calculating a bare steel corrosion rate according to this embodiment of the invention.

It is contemplated that those skilled in the art having reference to this specification will be readily able to generate and optimize computer software instructions, storable in some type of computer-readable medium in a form executable by the appropriate processing circuitry in server 20, for example, to carry out the particular processes and sub-processes for predicting the corrosion rate, including those illustrated in FIG. 6 according to this embodiment of the invention. It is contemplated that the generation and optimization of such computer software instructions can be carried out by those skilled persons, without undue experimentation. In addition, it is contemplated that those skilled persons will recognize variations and alternative implementations of the processes described here, such variations and alternatives contemplated to be within the scope of this invention as hereinafter claimed.

According to this embodiment of the invention, each of sub-processes 44, 46 determine a relationship of electropotential versus corrosion current density for an associated one of the reduction or oxidation reactions described above, and included in the overall corrosion rate model being evaluated. Considering the theory of operation described above for an example of the reactions evaluated in connection with this embodiment of the invention, it is apparent that each of these sub-processes 44, 46 will require its own particular input parameters, based on the mechanism being modeled and the particular control functions (activation, diffusion, hydration, etc.) involved in that mechanism.

Figure 7A:
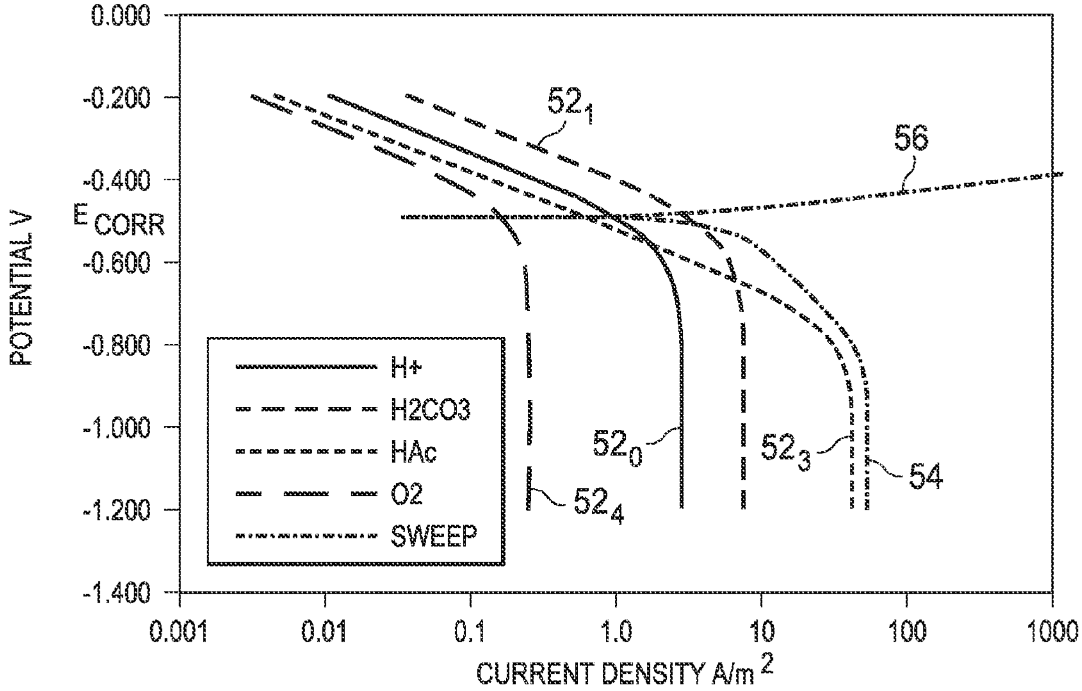
FIGS. 7*a* and 7*b* are plots of current-density vs. applied potential characteristics of various corrosion reaction mechanisms, according to one example of the operation of this embodiment of the invention.

Sub-process 44$_0$ evaluates the current-voltage relationship of the hydrogen ion (H+) reduction reaction. As described above, the cathodic current due to this reaction is activation controlled (i.e., voltage dependent) and is also diffusion, or mass transport, controlled. As such, sub-process 44$_0$ requires a value for hydrogen ionic concentration (H+) from input parameter set 42, as shown in FIG. 6. The result of sub-process 44$_0$ is a numerical or graphical representation between electropotential and current density, an example of which is illustrated in FIG. 7*a* as curve 52$_0$ in log-linear space.

Similarly, sub-process 44$_1$ evaluates the current-voltage relationship for the carbonic acid ($H_2CO_3$) reduction reaction. As described above, in this model, carbonic acid reduction is controlled by the combination of activation control and the carbonic acid hydration reaction rate. As such, sub-process 44$_1$ receives the values of $CO_2$ concentration and temperature from input parameter set 42, to determine its current-voltage relationship. Curve 52$_1$ of FIG. 7*a* illustrates an example of the result of sub-process 44$_1$, under a particular set of conditions.

Sub-process 44$_2$ similarly evaluates the current-voltage relationship for the water reduction reaction. According to the theory described above, this reduction reaction can be considered to be only under activation control, but in a temperature-dependent manner (and independent of pH for values between 3 and 6). As such, sub-process 44$_2$ receives the temperature value from input parameter set 42, and based on that value and various constants, calculates the current-voltage corrosion relationship for water reduction. Depending of course on the parameter values, some reduction reactions may not generate a significant corrosion current, and as such the corresponding current-voltage relationship for some mechanisms will not be relevant. In the example of FIG. 7*a*, water reduction is such a reaction, and as such no current-voltage relationship is illustrated for this mechanism.

Sub-process 44$_3$ evaluates the current-voltage relationship for the mechanism of acetic acid reduction. As described above, this reaction is under mixed activation and diffusion control. As such, the input parameters required by sub-process 44$_3$ under this example of the model includes a value for free acetic acid concentration, as derived by cooperative process 39, upon which the diffusion or mass transfer reaction limit depends; in addition, the activation control of acetic acid reduction requires the value for free acetic acid concentration, and also the values of pH and temperature from input parameter set 42. Sub-process $44_3$ thus generates the current-voltage relationship for this mechanism. An example of the resulting relationship is illustrated in FIG. 7*a* by curve $52_3$.

In this example of this embodiment of the invention, sub-process $44_4$ evaluates the current-voltage relationship for the mechanism of oxygen reduction. As evident from the foregoing description, oxygen reduction is under mixed activation and diffusion control, and is dependent on temperature, pH, and bulk oxygen concentration; values of these parameters in input parameter set 42 are thus forwarded to sub-process $44_4$. An example of the current-voltage relationship for oxygen reduction is illustrated in FIG. 7*a* by curve $52_4$.

Similarly, sub-process 46 evaluates the current-voltage relationship of the iron dissolution mechanism, which is reflected as an anodic current density (rather than a cathodic current density, as is the case for the reduction mechanisms). As described above, iron dissolution is modeled, in this example, as purely an activation relationship, dependent on temperature; the temperature value is provided by input parameter set 42 as before. Anodic current has a positive correlation with potential, as is fundamental in the art. This relationship is reflected by curve 56 of FIG. 7*a*, which represents the net anodic current after subtracting cathodic current (which is negligible at high overpotential). A current-voltage relationship of the anodic current is thus produced by an instance of sub-process 46 for an example set of input parameter values.

The derivation of a predicted overall corrosion rate, according to this embodiment of the invention, is based on the identification of an operating point in potential-current density space at which the anodic corrosion current balances the sum of cathodic current densities for all mechanisms. Accordingly, in process 48, the current-voltage relationships that are numerically or otherwise evaluated by sub-processes 44 for the reduction reactions are summed. FIG. 7*a* illustrates the current-voltage correlation of the net sum of these cathodic current densities (i.e., after subtracting anodic current, which is negligible at high negative overpotential), by way of curve 54. And in process 50, the balanced operating point in potential-current density space is identified, as will now be described.

Figure 8:
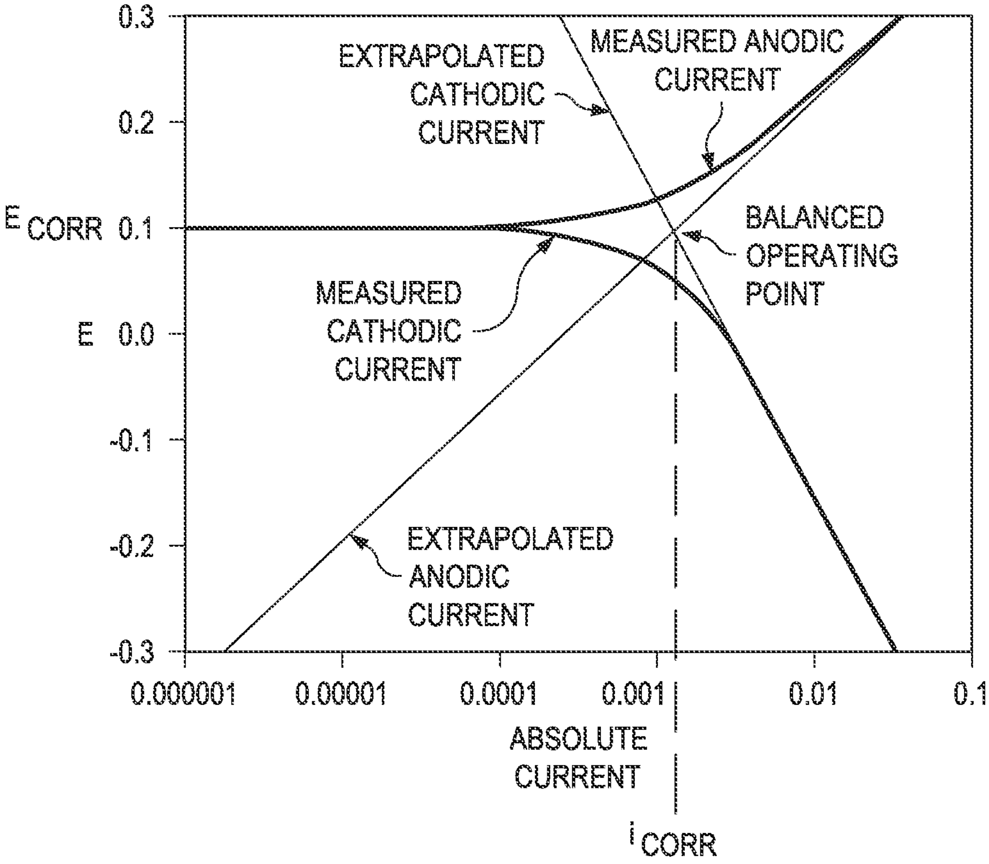
FIG. 8 is a theoretical plot of current-density vs. applied potential characteristics, illustrating the operation of calculating a bare steel corrosion rate according to this embodiment of the invention.

Process 50 operates in similar manner as conventional "corrosion experiments" known in the art, as will now be described relative to the log-linear plots in FIG. 8. FIG. 8 illustrates a conventional current-voltage plot used in corrosion experiments, in which current is measured separately at an anode and a cathode placed in a corrosive solution, such measurements made over variations in applied voltage between the anode and cathode (i.e., potential E, shown on the vertical axis). As would be expected, applying an increasingly positive potential in the anodic region (above open circuit potential) increases the rate of the anodic (oxidation) reaction and decreases the rate of the cathodic reactions. The net anodic current applied to the anode thus follows the oxidation reaction limits, while the current due to the reduction reactions at the cathode is negligible. Conversely, applying an increasingly negative potential in the cathodic region (below zero volts) increases the rate of the cathodic (reduction) reactions; the net current is thus limited by the reduction reactions, and the oxidation reaction current is negligible. Accordingly, by measuring the anodic current over varying potential in the anodic potential region, one can obtain a measure of the current-voltage relationship of the oxidation reaction; conversely, measuring the cathodic current over varying potential in the cathodic region will provide a measure of the current-voltage relationship of the sum of the reduction reactions.

In the equilibrium state, with no externally applied potential, the anodic current and cathodic currents will equal one another, with no net current being conducted. In other words, the oxidation reaction at the anode will be balanced with the reduction reactions at the cathode, or:

$$i_{(Fe)}=i_{(H+)}+i_{(H2CO3)}+i_{(H_2CO_3)}+i_{(H_2O)}+i_{(O_2)}$$

Because this balancing involves only a single anodic reaction, corrosion current $i_{CORR}$ can be calculated directly from the anodic current i(Fe) at this "balanced operating point". The corresponding potential at this balanced operating point is referred to as the open circuit potential $E_{OC}$ (or, for purposes of this description, $E_{CORR}$). An accepted approach to identifying this balanced operating point is to graphically or numerically extrapolate the measured current-voltage in the anodic region, extrapolate the measured current-voltage in the cathodic region, and identify the operating point at which these extrapolations intersect. An example of a numerical approach used in process 50 applies the Newton-Raphson method to locate the potential $E_{OC}$ at which the above equation balances. This approach is graphically illustrated in FIG. 8.

Figure 7B:
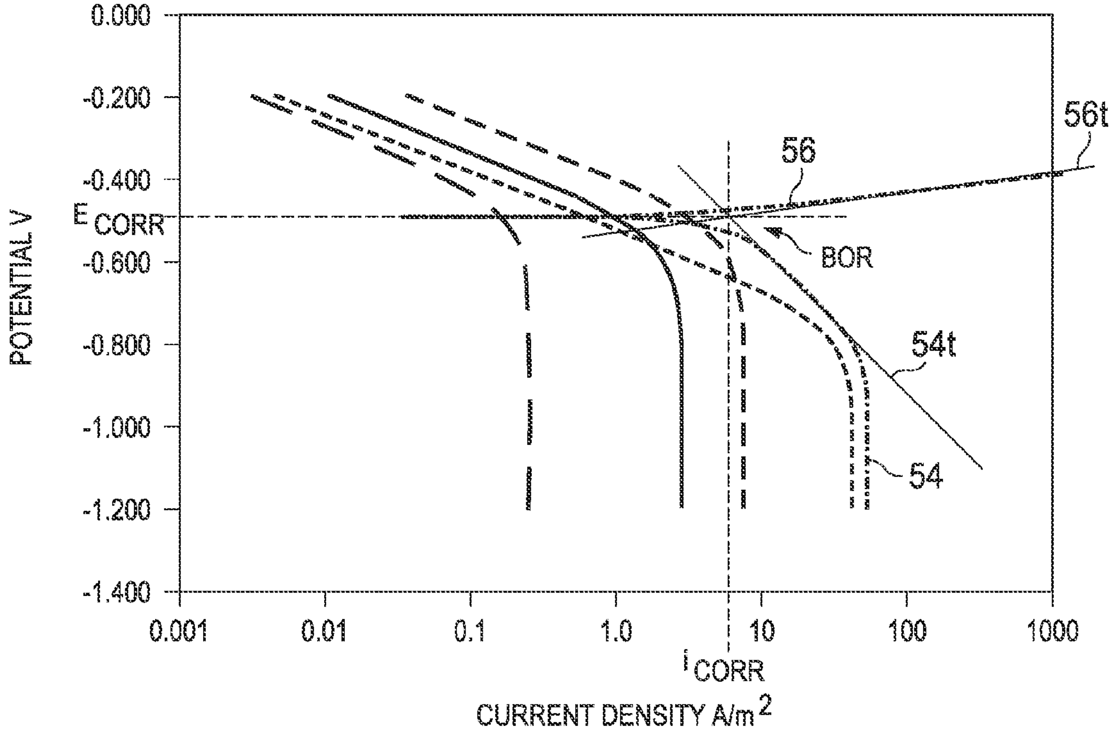

According to the preferred embodiment of the invention, process 50 within bare steel corrosion rate model process $32_3$ determines corrosion current $i_{CORR}$ and open circuit potential $E_{CORR}$ in numerical fashion. In this embodiment of the invention, by way of example, the current-voltage relationships of the net anodic current and the net cathodic currents have been derived in processes 46, 48, respectively. Process 50 identifies the common point in potential-current density space at which these anodic current and cathodic currents are the same. FIG. 7*b* graphically illustrates the result of the operation of process 50. In this case, tangent line 54*t* illustrates the numerical correlation of net cathodic current with voltage, and tangent line 56*t* illustrates the numerical correlation of net anodic current with voltage. Balanced operating point BOR is at the intersection of tangent lines 54*t*, 56*t*, and defines corrosion current $i_{CORR}$ and open circuit potential $E_{COR}$. For the example of FIG. 7*b*, the open circuit potential $E_{CORR}$ is about −0.5 volts, and the corrosion current $i_{CORR}$ is about 5 A/m$^2$.

It is contemplated that those skilled in the art having reference to this specification will be readily able to implement the appropriate computer software instructions that, upon execution by the appropriate computing circuitry in server 20, numerically (or graphically) solves for the open circuit potential $E_{CORR}$ and corrosion current $i_{CORR}$ from the modeled current-voltage relationships, without undue experimentation.

Referring back to FIG. 6, control now passes to process 52 in which the predicted bare steel corrosion rate is calculated by server 20, within modeling process $32_3$ carried out by model module $26_3$. One can express corrosion rate, in mm/year, as:

$$\text{Corrosion rate} = \frac{i_{CORR} M_w}{\rho_{Fe} n F}$$

where $\rho_{Fe}$ is the density of steel in kg/m$^3$, $M_w$ is the molecular weight of iron in kg/mol, n is the number of electrons exchanged in the electrochemical reaction, and F is the Faraday constant. These values $\rho_{Fe}$, $M_w$, and *n* are typically constants for the corrosion of steel in brine, and as such the corrosion rate equation can be simplified to a numerical evaluation:

$$\text{Corrosion rate}=(1.155)i_{CORR}$$

where corrosion current $i_{CORR}$ is expressed as A/m$^2$ and corrosion rate in mm/year. Referring back to FIG. 3, this resulting corrosion rate is forwarded to output module 25, for forwarding to interface 21 at workstation 11, and for storing in library 22 if desired.

FIG. 9 illustrates window 61 presented at workstation 11, by interface 21, that presents the results of Level I corrosion rate prediction process 35 to the user. As discussed above relative to input process 30, multiple "cases" can be evaluated by prediction system 10, such that the user is provided with a "what-if" analysis resulting from the variation of one or more parameter values, or measured parameters as the case may be. The upper portion of window 61 corresponds to the input spreadsheet window 41 previously described. Window 61 also presents the outputs from processes $\mathbf{32}_0$ ("In-situ Calc. pH"; pH status), $\mathbf{32}_1$ ("Scale Temp"), and $\mathbf{32}_3$ (hydraulic diameter; liquid velocity; flow pattern; flow regime status). Output window 61 also presents the output of bare steel corrosion rate process $\mathbf{32}_3$, expressed as a corrosion rate (mm-yr$^{-1}$), and also as a "severity level" corresponding to ranges of corrosion rates (analogous to a Richter scale for earthquakes, or Fujita scale for tornadoes). An example of such a corrosion "severity level" scale, based on untreated corrosion rate (Cru), is:

| Severity Level | Untreated corrosion rate (mm/yr) |
|---|---|
| 1 | Cru ≦ 0.01 |
| 2 | 0.01 < Cru ≦ 0.1 |
| 3 | 0.1 < Cru ≦ 1.0 |
| 4 | 1.0 < Cru ≦ 10.0 |
| 5 | Cru > 10.0 |

Of course, other severity level scales may be used, as desired by the user or operation. These severity levels may be useful in triggering corrective action, such as mitigation by corrosion inhibitors.

It is contemplated that more detailed output can be provided, for example in response to a user command, according to this embodiment of the invention. As evident from the foregoing description, several reduction reaction mechanisms are incorporated into the model. Accordingly, the contribution of each of the particular mechanisms to the overall corrosion rate calculation can be determined. For example, referring to FIG. 7*a*, it is evident that the dominant mechanism in this case is acetic acid reduction (HAc; curve $\mathbf{52}_3$), because the cathodic current for this reaction accounts for the largest portion of the summed net cathodic currents expressed by log-linear curve 54 (at potentials at which the anodic current contribution is negligible). This mechanistic insight provided according to this embodiment of the invention can be of great use to the corrosion engineer, particularly in selecting and designing corrosion inhibition strategies. In contrast, conventional empirical models operate as 'black box' models, in that the models produce a corrosion rate result but provide no explanation of which mechanisms dominate the overall corrosion reaction. The mechanistic models incorporated according to this embodiment of the invention enable the system to provide an explanation as to which elements of the complex $CO_2$ corrosion process are the important contributors to the final calculated rate.

In addition, the implementation of prediction system 10 according to this embodiment of the invention is advantageous in that it provides a common and simplified interface by way of which the user can provide inputs to the models, vary certain parameters, and obtain important mechanistic intelligence about the particular corrosive environment, in a user-friendly and efficient manner.

Referring back to FIG. 4, the bare steel corrosion rate determined in Level I prediction process 35 can be used as an input into further modeling and processing within an overall corrosion prediction framework. In this example, the bare steel corrosion rate from modeling process $\mathbf{32}_3$ can be analyzed in process 40, in combination with various "secondary" factors to determine if adjustments ought to be made to the predicted bare steel corrosion rate. Some of these "secondary" factors can be provided by one or more of the modeling processes 32 within Level I prediction process 35.

As discussed above, thermodynamic modeling process $\mathbf{32}_1$ provides an indication of scale formation temperature, which is presented in window 61 in the example of FIG. 9. Process 40 can compare the temperature of the system (as input in process 30) with this scale temperature generated by modeling process $\mathbf{32}_k$. If the actual temperature is conducive to scale formation, the bare steel corrosion rate determined by Level I prediction process 35 can be modified, typically according to an empirical model. In addition, it is contemplated that various other secondary factors can be considered in modifying the bare steel corrosion rate. It is known that the flow regime determined in modeling process $\mathbf{32}_2$ can affect the corrosion rate, particularly as the flow regime disperses its various phases; for example, "slug" flow typically involves the entrainment of large amounts of gas that are released into a turbulence zone, causing locally increased mass transfer rates that can affect the specific reduction mechanisms, generally by increasing the corrosion rate. In addition, the particular flow rates and regime can indicate particular types of corrosion (mesa, pitting, flow-induced localized corrosion, etc.) that can be considered in deriving the predicted corrosion rate beginning with the bare steel corrosion rate. Other secondary factors include whether substances such as $H_2S$ (or elemental sulfur), glycol, and the like are present in the system. Indications of water condensation rate, or oil wetting, and the like can also be of importance, and evaluated in process 40. It is contemplated that process 40 can be implemented by way of a rule set or logic sequence, applying criteria to the various secondary factors individually, or in combination, with the result of process 40 being an indication that the bare steel corrosion rate predicted by Level I prediction process 35 requires modification.

If one or more of these secondary factors evaluated in process 40 indicate that the corrosion rate ought to be modified, the corresponding one or more secondary factors can be applied in process 45 to produce a final untreated corrosion rate. It is contemplated that modification process 45 can be realized by way of conventional or derived empirical models or relationships, by way of which the effects of the secondary factors (e.g., scale formation) are used to modify the predicted corrosion rate. This predicted corrosion rate can be the corrosion rate output at workstation 11 via interface 21, if desired (e.g., in window 61 of FIG. 9). Alternatively, window 61 may present separate predicted corrosion rates to present the "raw" corrosion rate predicted by Level I prediction process 35, and the modified "final untreated" corrosion rate based on this prediction, as modified by process 45.

This resulting predicted corrosion rate, according to this embodiment of the invention, can also be used as an input to automated analysis of the effect of a corrosion inhibitor. As known in the art, corrosion inhibitor chemicals can be injected into the system to inhibit corrosion, for example by forming a passivation layer, by inhibiting either the oxidation reaction or one or more of the reduction reactions, or by scavenging dissolved oxygen to reduce oxygen ion concentration. Conventional corrosion inhibitors include hexamine, phenylenediamine, dimethylethanolamine, sodium nitrite, cinnamaldehyde, condensation products of aldehydes and amines (imines), chromates, nitrites, phosphates, hydrazine, ascorbic acid, and others; nitrite or chromate anodic inhibitors that passivate steel surfaces; and cathodic inhibitors such as zinc oxide, which inhibits the water reduction reaction. The effectiveness of any corrosion inhibitor will depend on its availability (i.e., percentage of time that the inhibitor is available in the system) and its efficiency, which depends on a wide range of factors such as the material of the tubing or pipeline, the chemical composition of the fluids being conveyed by the tubing or pipeline, operating temperature, and the like.

According to this embodiment of the invention, as shown in FIG. 4, a threshold determination can be made in decision 47, to determine whether the final untreated corrosion rate from process 45 is above a threshold value at which the use of corrosion inhibitors ought to be investigated; it is contemplated that this threshold level (whether as a corrosion rate or as a severity level) will be determined in advance, based on such factors as the capability of candidate inhibitor chemicals to effectively mitigate corrosion rates given the technical limitations of those chemicals and their availability in the system, etc. If the predicted rate is not high enough to indicate consideration of inhibitors (decision 47 returns a "no" result), the prediction process can end. If the predicted corrosion rate indicates that an inhibitor ought to be considered (decision 47 is "yes"), process 48 can then be performed to determine the inhibitor available and efficiency for the pipe system under consideration. Conventional models for evaluating the availability and efficiency of one or more of the corrosion inhibitors are suitable for use in connection with process 48. For example, one can define corrosion inhibitor efficiency $CI_{effic}$ as:

$$CI_{effic} = 1 - \frac{CR_I}{CR_U}$$

where $CR_I$ and $CR_U$ are the inhibited and uninhibited corrosion rates for the pipe system under consideration. It is contemplated that some of the input parameters used in determining the corrosion rate in Level I prediction process 35, and perhaps in process 45, will be of use in process 48, as suggested by FIG. 4. An availability A of the corrosion inhibitor may be estimated as the proportion of time that the corrosion inhibitor injection system injects the inhibitor into the system at a level about the required dosage, typically considered over a year's time. Upon evaluation of the inhibitor availability and efficiency in process 48, a corrosion inhibitor effectiveness E can be calculated (e.g., from the product $E=(CI_{effic})A$), also in process 48. Process 50 can then be performed by prediction system 10 to arrive at a final treated corrosion rate, according to conventional empirical models for evaluation of the treated corrosion.

Alternatively, it is contemplated that the effect of the corrosion inhibitor on the corrosion reaction can be considered in a mechanistic sense in process 50. For example, the presence of an inhibitor (particularly those that are directed at chemically inhibiting reduction reactions) can be incorporated into the various reduction reaction models, either by changing one or more of the constants applied by those models, or alternatively by applying an inhibition factor or adjustment to the reduction current for that mechanism. In this event, process 50 would be carried out by server 20 again executing modeling process 32$_3$, but applying the constants, input values, or adjustments corresponding to the corrosion inhibitor at the determined availability and efficiency.

In any event, the result of process 50 includes at least an output final treated corrosion rate. FIG. 10 illustrates window 71, which represents an example of a full set of output results at workstation 11, presented by interface 21. Window 71 includes the water chemistry and flow model outputs, and the predicted untreated corrosion rate, as in the example of window 61 of FIG. 9.

In the example of FIG. 10, window 71 also includes additional information, including the results of processes 48, 50 in evaluating the effectiveness of a corrosion inhibitor relative to the pipe system under evaluation. In this example, additional parameters of a "corrosion allowance" CA and "design life" $T_{Life}$ are input by the user or otherwise associated with the system, and indicate a tolerable corrosion level (mm/yr) and number of years of expected tubing or pipeline life, respectively. Also available to prediction system 10 as a result of process 50 are the treated corrosion rate $CR_I$ (shown in window 71 as "Inhibited Corrosion Rate"), and a required system performance $E_{Req}$, which is a design limit corresponding to the highest corrosion rate tolerable to safely reach the design life of the system. Process 50 can thus compare the treated corrosion rate $CR_I$ to the required system performance $E_{Req}$ to determine whether the corrosion inhibitor treatment will be adequate to meet the desired system life.

According to another embodiment of this invention, process 50 can determine a range of corrosion inhibitor effectiveness for the pipe system, and use that range in combination with the required system performance to assist in the engineering and optimization of the corrosion inhibitor system. For example, one can identify recommended minimum and maximum values of corrosion inhibitor efficiency and availability, based on prior experience with typically available corrosion inhibitor technologies:

| | | Minimum | Maximum |
|---|---|---|---|
| Corrosion Inhibitor Efficiency | $CI_{effic}$ | 90% | For T ≤ 120° C.: $\mathrm{Min}\left[100\times\left(1-\frac{0.1}{CR_U}\right), 99.5\%\right]$ For 120° C. < $T$ ≤ 120° C.: $\mathrm{Min}\left[100\times\left(1-\frac{0.2}{CR_U}\right), 99.5\%\right]$ |
| Injection System Availability | A | 95% | 98% |

-continued

| | | Minimum | Maximum |
|---|---|---|---|
| Corrosion Inhibitor Injection System Effectiveness (minimum and maximum values) | $E_{min} = (CI_{effic})_{min} A_{min}$; $E_{max} = (CI_{effic})_{max} A_{min}$ | 85.5% | For T ≤ 120° C.: $0.98 \times \mathrm{Min}\left[100 \times \left(1 - \frac{0.1}{CR_U}\right), 99.5\%\right]$ For 120° C. < T ≤ 120° C.: $0.98 \times \mathrm{Min}\left[100 \times \left(1 - \frac{0.2}{CR_U}\right), 99.5\%\right]$ |

As evident from this table, the maximum corrosion inhibitor efficiency $CI_{effic}$ varies with temperature, with different efficiencies in two temperature ranges. According to this example, if the observed temperature is outside of those ranges, an indicator "flag" or other alert will be displayed to indicate that a valid inhibited corrosion rate should not be assumed. In the example in this table, if the observed temperature exceeds 150° C., an indicator "flag" displaying "Ask SME Hi-T" may be displayed in window 71, suggesting that the user of prediction system 10 should ask a "subject matter expert" ("SME") for assistance in evaluating the effectiveness of the corrosion inhibitor in that situation. For temperatures below 150° C. in this example, the minimum value of corrosion inhibitor effectiveness $E_{min}$ amounts to the product of the minimum values of efficiency $(CI_{effic})_{min}$ and availability $A_{min}$, while the maximum value of effectiveness $E_{max}$ amounts to the product of the maximum values of efficiency $(CI_{effic})_{max}$ and availability $A_{max}$. In this embodiment of the invention, process 50 goes on to compare the required system performance $E_{Req}$ (e.g., as defined above) to the range defined by the minimum value of corrosion inhibitor effectiveness $E_{min}$ and the maximum value of corrosion inhibitor effectiveness $E_{max}$. This comparison determines whether the corrosion inhibitor technology under consideration is capable of attaining the desired corrosion performance. Referring to FIG. 10, prediction system 10 causes the "System Effectiveness" flag in window 71 to display an "Accept" result if required system performance $E_{Req}$ is within the range of attainable corrosion inhibitor effectiveness (i.e., $E_{min} < E_{Req} < E_{max}$). In this situation, guidance values of system availability A and corrosion inhibitor efficiency $CI_{effic}$ can also be displayed to the user by prediction system 10, so that the corrosion inhibitor system can be properly set up and adjusted to meet the corrosion requirements at minimum cost; efficiency and availability predictions for the corrosion inhibitor system can also be displayed. On the other hand, if the required system performance $E_{Req}$ is outside of the range of attainable corrosion inhibitor effectiveness, process 50 sets flags in window 71 indicating that the user ought to seek input from a corrosion expert (the "SME") if the calculated required effectiveness lies outside that range. The flag "Ask SME Lo" indicates an acceptable situation for the inhibition system, in that the required treated corrosion rate can be attained even at the minimum corrosion inhibitor efficiency and availability ($E_{Req} < E_{min}$), but that perhaps the corrosion inhibitor system ought to be further optimized, for example to reduce cost. On the other hand, the flag "Ask SME Hi" indicates the unacceptable situation in which the maximum attainable corrosion inhibitor effectiveness $E_{max}$ falls short of the required system performance $E_{Req}$; additional engineering input from the subject matter expert ("SME") is therefore required, either to re-engineer the corrosion inhibitor system or to re-design the pipe system itself.

While certain examples of various indicator "flags" are also shown in window 71, it is of course contemplated that additional or different indicators can alternatively or additionally be realized.

The method and system according to embodiments of the invention is applicable at various stages of pipe system design and operation, as mentioned above. For example, oil and gas pipe systems constructed from carbon steel are typically designed with a certain corrosion allowance (e.g., from 3 to 8 mm/yr), assuming a gradual controlled uniform metal loss, to ensure that adequate minimum wall thickness remains at the end of the design lifecycle to sustain the working load, based on industry or company-specific standards, expected operational pressure, and the mechanical and structural properties of the fabricated steel. As such, this method and system can be used in the design stage, to assist in the selection of tubing or pipeline material; evaluation of predicted corrosion rates can help determine whether lower-cost carbon steel (with or without corrosion inhibitor treatment) can suffice, or if instead higher-cost (and less vulnerable) alloy material is necessary to achieve the desired design life. In this design analysis, this method and system can be used to select pipe wall thickness, for a given material and in combination with corrosion inhibitor treatment.

During operation, the method and system according to embodiments of the invention can be used to evaluate existing tubing and pipelines. Such evaluation can include prediction of continued corrosion performance, beginning with baseline minimum wall thicknesses, for example to establish maintenance schedules, evaluate the efficacy and economic benefit of corrosion inhibitor treatment, and to determine replacement strategy.

As discussed above, the method and system according to embodiments of the invention is applicable for use in various applications in the oil and gas industry. In the downhole context, the primary inputs to the prediction system are those associated with water chemistry: all ions in mg/l, bicarbonate, organic acid salts such as acetates; and physical parameters such as gas/oil/water flow rates; temperature at the interval of interest, and partial pressure of $CO_2$ at the appropriate location (the most conservative of the bottomhole, reservoir, or bubble point pressure). In the downhole context, for corrosion to occur, free water must be present at the pipe wall. As such, gas wells operating above the dew point are typically not vulnerable to corrosion. For oil wells, the water cut and flow regime will be critical to determining if the pipe wall is water-wet, with the emulsion tendency of the crude oil also being a factor. For fully mixed flowing conditions in the oil well, the resulting emulsion will be water-in-oil at low water cuts, inverting to oil-in-water at high water cuts (the inversion point being dependent on water cut, temperature, and pressure; typically at about 30% to 40% water). In the downhole context, it is important to know the in situ pH at temperature and pressure, and it is also important to validly analyze the bicarbonate and acetate composition, as discussed above. Given these factors, it has been observed that the method and system according to embodiments of this invention has provided rigorous and robust predicted corrosion rate information.

Also as discussed above, the method and system according to embodiments of this invention is also applicable to flowline, or pipeline, systems and applications. Similar concerns regarding pH determination and water analysis, as in the downhole tubing context, are also present in the flowline situation. For wet natural gas pipelines operating under stratified flow, the two distinct corrosion environments of (i) the bottom of the line, which is continually wetted by condensed water, inhibitor and hydrocarbons, and (ii) the top of the line, which is wetted by condensing liquids, should be considered. In addition, changes in inclination, bends, or any other type of flow disturbance should be evaluated in the flowline context. Low points tend to collect water, and steeper uphill inclinations require a higher flow velocity for water to be removed. Flow disturbances such as bends or other flow obstructions can lead to local water wetting or water entrainment. For example, at a bend, the water phase may be forced to the wall by centripetal forces, while on the other hand, flow disturbances can lead to better mixing, and therefore entrainment, of the water phase. In seawater and water injection flowline applications, it is contemplated that oxygen excursions will often be present, and will require analysis with and with such excursions, with the ultimate corrosion rate being prorated between the two.

It is also contemplated that embodiments of this invention can be applied to piping in process equipment, including gas compression systems. In such systems, the corrosion of pipework downstream from gas compressors, oil stabilization systems, wet gas coolers, glycol contactors, and the like can be analyzed according to embodiments of this invention.

In these applications and contexts, and in others that will be apparent to those skilled in the art having reference to this specification, it is contemplated that this invention will provide important benefits and advantages. As discussed above, embodiments of this invention provide a unified system and method for predicting corrosion rates in a wide range of pipe applications, in a manner that is user-friendly and familiar to the user. In performing its prediction, however, these embodiments of the invention utilize rigorous mechanistic models of multiple reaction mechanisms. This not only provides an accurate and thorough result, but enables a deeper level of analysis so that the corrosion engineer can identify the dominant reaction mechanisms in the overall corrosion rate, and design specific treatments or construction techniques that can have the best effect on the corrosion rate for the least economic cost. Improved lifetime performance and reliability of the pipe system can thus be efficiently attained, based on this improved understanding of the particular mechanisms of importance.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of predicting a rate of corrosion in a pipe, comprising the steps of:

receiving, by a central processing unit (CPU), data corresponding to input parameter values comprising at least one value representative of a water chemistry parameter of fluid flow in the pipe, and at least one value representative of a physical parameter of the fluid flow in the pipe;

for each of a plurality of reduction reactions, calculating, by the CPU, representative current-voltage relationship responsive to one or more of the input parameter values represented by the received data;

deriving, by the CPU, a summed current-voltage relationship representative of the plurality of reduction reactions;

for an oxidation reaction, calculating, by the CPU, a representative current-voltage relationship responsive to one or more of the input parameter values represented by the received data;

identifying, by the CPU, a current density value at a balanced operating point of the summed current-voltage relationship representative of the plurality of reduction reactions with respect to the current voltage relationship representative of the oxidation reaction;

calculating, by the CPU, a predicted corrosion rate responsive to the identified current density value; and displaying the predicted corrosion rate at a visual display.

2. The method of claim 1, further comprising:

determining an in-situ pH value responsive to the one or more of the input parameter values represented by the received data;

wherein the calculating of a representative current-voltage relationship for at least one of the reduction reactions is performed responsive to the in-situ pH value.

3. The method of claim 2, wherein the at least one value representative of a water chemistry parameter comprises an acetate concentration value, and a bicarbonate concentration value;

wherein the at least one value representative of a physical parameter of the fluid flow comprises an indication of whether condensed water is present;

and further comprising:

determining a free acetic acid concentration considering the acetate concentration value as acetates, responsive to either the bicarbonate concentration value exceeding a threshold value, or the indicator indicating that condensed water is present; and determining the free acetic acid concentration considering the acetate concentration value as acetic acid, responsive to the combination of the bicarbonate concentration value not exceeding the threshold value and the indicator indicating that condensed water is not present.

4. The method of claim 1, further comprising:

determining a scale temperature responsive to the one or more of the input parameter values represented by the received data.

5. The method of claim 1, further comprising:

determining at least one flow parameter responsive to the one or more of the input parameter values represented by the received data.

6. The method of claim 5, further comprising:

responsive to one or more of the input parameter values represented by the received data, determining an efficiency of a corrosion inhibitor substance; and calculating a treated corrosion rate responsive to the predicted corrosion rate and to the efficiency of the corrosion inhibitor substance.

7. The method of claim 6, further comprising:

receiving an input value corresponding to an availability of the corrosion inhibitor substance;

wherein the treated corrosion rate IS calculated also responsive to the availability of the corrosion inhibitor substance.

8. The method of claim 1, wherein the at least one value representative of a physical parameter of the fluid flow comprises a temperature of the fluid;

and further comprising:

determining a scale temperature responsive to the one or more of the input parameter values represented by the received data;

determining at least one flow parameter responsive to the one or more of the input parameter values represented by the received data;

responsive to at least one of the at least one flow parameter, to a comparison of the temperature of the fluid to the scale temperature, calculating an untreated final corrosion rate by modifying the predicted corrosion rate.

9. The method of claim 8, further comprising:

responsive to one or more of the input parameter values represented by the received data, determining an efficiency of a corrosion inhibitor substance; and calculating a treated corrosion rate responsive to the predicted corrosion rate and to the efficiency of the corrosion inhibitor substance.

10. The method of claim 9, further comprising:

receiving an input value corresponding to an availability of the corrosion inhibitor substance;

wherein the treated corrosion rate IS calculated also responsive to the availability of the corrosion inhibitor substance.

11. The method of claim 1, further comprising:

determining minimum and maximum efficiency values of a corrosion inhibitor substance, at least one of the minimum and maximum efficiency values determined responsive to one or more of the input parameter values represented by the received data and to the predicted corrosion rate;

receiving minimum and maximum availability values of the corrosion inhibitor substance;

determining minimum and maximum effectiveness values from the minimum and maximum efficiency values and the minimum and maximum availability values;

comparing a required system corrosion performance to the minimum and maximum effectiveness values; and displaying an indicator flag responsive to the required system corrosion performance being outside of a range indicated by the minimum and maximum effectiveness values.

12. The method of claim 1, wherein the plurality of reduction reactions comprise an acetic acid reduction reaction and an oxygen reduction reaction.

13. A computerized prediction system for predicting a rate of corrosion in a pipe, comprising:

one or more processing units for executing program instructions; and program memory, coupled to the one or more processing units, for storing a computer program including program instructions that, when executed by the one or more processing units, is capable of causing the computer system to perform a sequence of operations for predicting a rate of corrosion in a pipe, the sequence of operations comprising:

receiving data corresponding to input parameter values comprising at least one value representative of a water chemistry parameter of fluid flow in the pipe, and at least one value representative of a physical parameter of the fluid flow in the pipe;

for each of a plurality of reduction reactions, calculating a representative current-voltage relationship responsive to one or more of the input parameter values represented by the received data;

deriving a summed current-voltage relationship representative of the plurality of reduction reactions;

for an oxidation reaction, calculating a representative current-voltage relationship responsive to one or more of the input parameter values represented by the received data;

identifying a current density value at a balanced operating point of the summed current-voltage relationship representative of the plurality of reduction reactions with respect to the current voltage relationship representative of the oxidation reaction;

calculating a predicted corrosion rate responsive to the identified current density value.

14. The system of claim 13, further comprising:

an input peripheral, coupled to at least one of the processing units, for receiving one or more of the input parameter values; and an output peripheral, coupled to at least one of the processing units, for presenting user-readable output;

and wherein the sequence of operations further comprises:

displaying the predicted corrosion rate at the output peripheral.

15. The system of claim 14, wherein the sequence of operations further comprises:

determining minimum and maximum efficiency values of a corrosion inhibitor substance, at least one of the minimum and maximum efficiency values determined responsive to one or more of the input parameter values represented by the received data and to the predicted corrosion rate;

receiving minimum and maximum availability values of the corrosion inhibitor substance;

determining minimum and maximum effectiveness values from the minimum and maximum efficiency values and the minimum and maximum availability values;

comparing a required system corrosion performance to the minimum and maximum effectiveness values; and displaying an indicator flag responsive to the required system corrosion performance being outside of a range indicated by the minimum and maximum effectiveness values.

16. The system of claim 13, further comprising:

a memory resource, coupled to at least one of the processing units, for storing the predicted corrosion rate.

17. The system of claim 13, wherein the sequence of operations further comprises;

determining an in-situ pH value responsive to the one or more of the input parameter values represented by the received data;

wherein the calculating of a representative current-voltage relationship for at least one of the reduction reactions is performed responsive to the in-situ pH value.

18. The system of claim 17, wherein the at least one value representative of a water chemistry parameter comprises an acetate concentration value, and a bicarbonate concentration value;

wherein the at least one value representative of a physical parameter of the fluid flow comprises an indication of whether condensed water is present;

and further comprising:

determining a free acetic acid concentration considering the acetate concentration value as acetates, responsive to either the bicarbonate concentration value exceeding a threshold value, or the indicator indicating that condensed water is present; and determining the free acetic acid concentration considering the acetate concentration value as acetic acid, responsive to the combination of the bicarbonate concentration value not exceeding the threshold value and the indicator indicating that condensed water is not present.

19. The system of claim 13, wherein the sequence of operations further comprises:

wherein the at least one value representative of a physical parameter of the fluid flow comprises a temperature of the fluid;

and wherein the sequence of operations further comprises:

determining a scale temperature responsive to the one or more of the input parameter values represented by the received data;

determining at least one flow parameter responsive to the one or more of the input parameter values represented by the received data; and responsive to at least one of the at least one flow parameter; to a comparison of the temperature of the fluid to the scale temperature, calculating an untreated final corrosion rate by modifying the predicted corrosion rate.

20. The system of claim 19, wherein the sequence of operations further comprises:

responsive to one or more of the input parameter values represented by the received data, determining an efficiency of a corrosion inhibitor substance;

receiving an input value corresponding to an availability of the corrosion inhibitor substance;

calculating a treated corrosion rate responsive to the untreated final corrosion rate and to the efficiency and availability of the corrosion inhibitor substance.

21. The system of claim 13, wherein the plurality of reduction reactions comprise an acetic acid reduction reaction and an oxygen reduction reaction.

22. The system of claim 13, wherein the at least one processing units comprise:

a client central processing unit; and a server central processing unit;

wherein the receiving operation is performed by the client central processing unit;

wherein the calculating, deriving, and identifying operations are performed by the server central processing unit;

and wherein the sequence of operations further comprises:

communicating the data received by the client central processing unit to the server central processing unit.

23. A non-transitory computer-readable medium storing a computer program that, when executed on a computer system, causes the computer system to perform a sequence of operations for estimating a corrosion rate of a pipe, the sequence of operations comprising:

receiving data corresponding to input parameter values comprising at least one value representative of a water chemistry parameter of fluid flow in the pipe, and at least one value representative of a physical parameter of the fluid flow in the pipe;

for each of a plurality of reduction reactions, calculating a representative current-voltage relationship responsive to one or more of the input parameter values represented by the received data;

deriving a summed current-voltage relationship representative of the plurality of reduction reactions;

for an oxidation reaction, calculating a representative current-voltage relationship responsive to one or more of the input parameter values represented by the received data;

identifying a current density value at a balanced operating point of the summed current-voltage relationship representative of the plurality of reduction reactions with respect to the current voltage relationship representative of the oxidation reaction;

calculating a predicted corrosion rate responsive to the identified current density value; and displaying the predicted corrosion rate at a visual display.

24. The medium of claim 23, wherein the sequence of operations further comprises:

determining an in-situ pH value responsive to the one or more of the input parameter values represented by the received data;

wherein the calculating of a representative current-voltage relationship for at least one of the reduction reactions is performed responsive to the in-situ pH value.

25. The medium of claim 23, wherein the at least one value representative of a water chemistry parameter comprises an acetate concentration value, and a bicarbonate concentration value;

wherein the at least one value representative of a physical parameter of the fluid flow comprises an indication of whether condensed water is present;

and wherein the sequence of operations further comprises:

determining a free acetic acid concentration considering the acetate concentration value as acetates, responsive to either the bicarbonate concentration value exceeding a threshold value, or the indicator indicating that condensed water is present; and determining the free acetic acid concentration considering the acetate concentration value as acetic acid, responsive to the combination of the bicarbonate concentration value not exceeding the threshold value and the indicator indicating that condensed water is not present.

26. The medium of claim 25, wherein the sequence of operations further comprises:

responsive to one or more of the input parameter values represented by the received data, determining an efficiency of a corrosion inhibitor substance; and calculating a treated corrosion rate responsive to the untreated final corrosion rate and to the efficiency of the corrosion inhibitor substance.

27. The medium of claim 26, wherein the sequence of operations further comprises:

receiving an input value corresponding to an availability of the corrosion inhibitor substance;

wherein the treated corrosion rate IS calculated also responsive to the availability of the corrosion inhibitor substance.

28. The medium of claim 23, wherein the sequence of operations further comprises determining a scale temperature responsive to the one or more of the input parameter values represented by the received data.

29. The medium of claim 23, wherein the sequence of operations further comprises determining at least one flow parameter responsive to the one or more of the input parameter values represented by the received data.

30. The medium of claim 23, wherein the at least one value representative of a physical parameter of the fluid flow comprises a temperature of the fluid;

and wherein the sequence of operations further comprises:

determining a scale temperature responsive to the one or more of the input parameter values represented by the received data;

determining at least one flow parameter responsive to the one or more of the input parameter values represented by the received data;

responsive to at least one of the at least one flow parameter, to a comparison of the temperature of the fluid to the scale temperature, calculating an untreated final corrosion rate by modifying the predicted corrosion rate.

31. The medium of claim 23, wherein the sequence of operations further comprises:

determining minimum and maximum efficiency values of a corrosion inhibitor substance, at least one of the minimum and maximum efficiency values determined responsive to one or more of the input parameter values represented by the received data and to the predicted corrosion rate;

receiving minimum and maximum availability values of the corrosion inhibitor substance;

determining minimum and maximum effectiveness values from the minimum and maximum efficiency values and the minimum and maximum availability values;

comparing a required system corrosion performance to the minimum and maximum effectiveness values; and displaying an indicator flag responsive to the required system corrosion performance being outside of a range indicated by the minimum and maximum effectiveness values.

32. The medium of claim 23, wherein the plurality of reduction reactions comprise an acetic acid reduction reaction and an oxygen reduction reaction.

* * * * *